United States Patent
Jones et al.

(10) Patent No.: US 6,397,325 B1
(45) Date of Patent: May 28, 2002

(54) MICROCOMPUTER WITH PACKET TRANSLATION FOR EVENT PACKETS AND MEMORY ACCESS PACKETS

(75) Inventors: Andrew Michael Jones; Michael David May, both of Bristol (GB)

(73) Assignee: STMicroelectronics, Limited, Bristol (GB)

(*) Notice: Subject to any disclaimer, the term of this patent is extended or adjusted under 35 U.S.C. 154(b) by 0 days.

(21) Appl. No.: 09/301,646

(22) Filed: Apr. 28, 1999

(30) Foreign Application Priority Data

Apr. 28, 1998 (GB) .............................. 9809197

(51) Int. Cl.⁷ .............................................. G06F 13/38
(52) U.S. Cl. .................. 712/227; 710/71; 710/260; 710/268; 710/5; 710/39; 712/200; 712/38
(58) Field of Search ................................. 712/200, 227, 712/25, 38; 710/5, 71, 260, 268, 39

(56) References Cited

U.S. PATENT DOCUMENTS

| 5,283,904 A | 2/1994 | Carson et al. ............... 710/266 |
| 5,495,615 A | 2/1996 | Nizar et al. .................. 710/260 |
| 6,125,416 A * | 9/2000 | Warren ......................... 710/71 |

FOREIGN PATENT DOCUMENTS

| EP | 0 644 489 A2 | 3/1995 |
| WO | WO 95/16965 | 6/1995 |

* cited by examiner

*Primary Examiner*—Kenneth S. Kim
(74) *Attorney, Agent, or Firm*—Lisa K. Jorgenson; David V. Carlson; Seed IP Law Group PLLC

(57) ABSTRACT

A computer system includes an address and data path interconnecting an on-chip CPU with a module and an external communication port, event request packets being generated by the CPU and the module and memory access packets being generated by the CPU, each packet having a destination address and being distributed in parallel format on-chip with a reduction to a more serial format for off-chip communication.

43 Claims, 15 Drawing Sheets

Fig.19.

| DEST | EVENT REQUEST (0x01) | TID | SRC | ADDR | MASK |
|---|---|---|---|---|---|
| 0 | 1 | 2 | 3 | 4,5,6 | 7 |

Fig.20.

response packet:

| DEST | LOAD WORD RESPONSE (0x29) | TID | DATA |
|---|---|---|---|
| 0 | 1 | 2 | 3...10 |

Fig.21.

| DEST | STORE WORD REQUEST (0x11) | TID | SRC | ADDR | MASK | DATA |
|---|---|---|---|---|---|---|
| 0 | 1 | 2 | 3 | 4,5,6 | 7 | 8...15 |

Fig.22.

response packet:

| DEST | STORE WORD RESPONSE (0x31) | TID |
|---|---|---|
| 0 | 1 | 2 |

Fig.23.

| DEST | EVENT REQUEST (0x01) | TID | SRC | ADDR | devID | OPER-AND |
|---|---|---|---|---|---|---|
| 0 | 1 | 2 | 3 | 4,5,6 | 7 | 8...15 |

Fig.24.

| DEST | EVENT RESPONSE (0x21) | TID |
|---|---|---|
| 0 | 1 | 2 |

MICROCOMPUTER WITH PACKET TRANSLATION FOR EVENT PACKETS AND MEMORY ACCESS PACKETS

The invention relates to a microcomputer and computer system including a method of operating the same.

BACKGROUND OF THE INVENTION

Computer systems may incorporate a processor with a plurality of other devices which may generate signals for transmission between each other on-chip and between chips. When transmitting interrupt signals between devices on-chip the source and destinations may be numerous thereby requiring complex interconnections or control systems. Problems can arise in transmitting such signals between chips due to the limited number of pins available for external connections.

It is an object of the present invention to provide an improved computer system and method of operating a computer system in which a plurality of signals including interrupt signals may be transmitted between devices on-chip and off-chip while avoiding the need for excessive numbers of pins or wires.

SUMMARY OF THE INVENTION

The invention provides a computer system comprising an integrated circuit device having an address and data path interconnecting a plurality of on-chip devices including at least one CPU, at least one other module and an external communication port, said CPU being arranged to generate event request packets and memory access packets, said module having circuitry responsive to an event to generate event request packets, each of said event and memory access packets including a destination address and being distributed in parallel format on said address and data path, the external communication port including circuitry to reduce the parallel format of each packet to a more serial format for off-chip communication.

Preferably said CPU and at least one other module includes packet generating circuitry operable in response to receipt of a request packet to generate a response packet for distribution on said address and data path.

Preferably said packet generating circuitry is arranged to provide in each request packet an indication of the source of the packet as well as the destination, said source address being used as a destination address in each response packet.

Preferably said address and data path comprises one or more buses arranged for distribution of request and response packets in bit parallel format.

Preferably a memory interface is provided on-chip communicating with said address and data path to permit memory read and write operations.

Preferably the external communication port on each chip includes bit format translation circuitry for translating on-chip bit parallel format to off-chip bit serial format.

Preferably said at least one other module includes packet generating circuitry to generate event request packets of two types, the first type forming an interrupt request and a second type providing control commands.

Preferably said integrated circuit device comprises an on-chip memory accessible by addressed memory access packets on said address and data path.

The on-chip memory interface may be connected to an off-chip memory.

The invention includes a method of operating a computer system comprising an integrated circuit device having an address and data path interconnecting a plurality of on-chip devices including at least one CPU, at least one other module and an external communication port, which method comprises distributing on said address and data path event request packets generated by packet generating circuitry in said at least one module and distributing event request packets and memory access packets generated by packet generating circuitry of said CPU, said event and memory access packets being distributed in parallel format on said address and data path and the external communication port being operated to reduce the parallel format of each packet to a more serial format for off-chip communication.

Preferably packet generating circuitry of said CPU is operable in response to receipt of a request packet to generate a response packet for distribution on said address and data path.

Preferably each request packet includes an indication of the source of the packet as well as the destination, said source address being used as a destination address in each response packet.

Preferably memory access operations are effective with an on-chip memory through a memory interface provided on-chip and communicating with said address and data path.

An off-chip memory may be connected to an external memory interface on the chip, and memory access operations being effected by memory access packets on the address and data path addressing said external memory interface.

Communication through the external memory interface may remain in bit parallel format.

Preferably said event request packets include packets of two types, a first type forming an interrupt request and a second type providing control commands.

BRIEF DESCRIPTION OF THE DRAWINGS

FIGS. 19, 20, 21, 22, 23, and 24 show different bit packet formats for distribution on the address and data paths of the devices shown in FIGS. 1 and 18.

DESCRIPTION OF THE PREFERRED EMBODIMENTS

Figure 1:
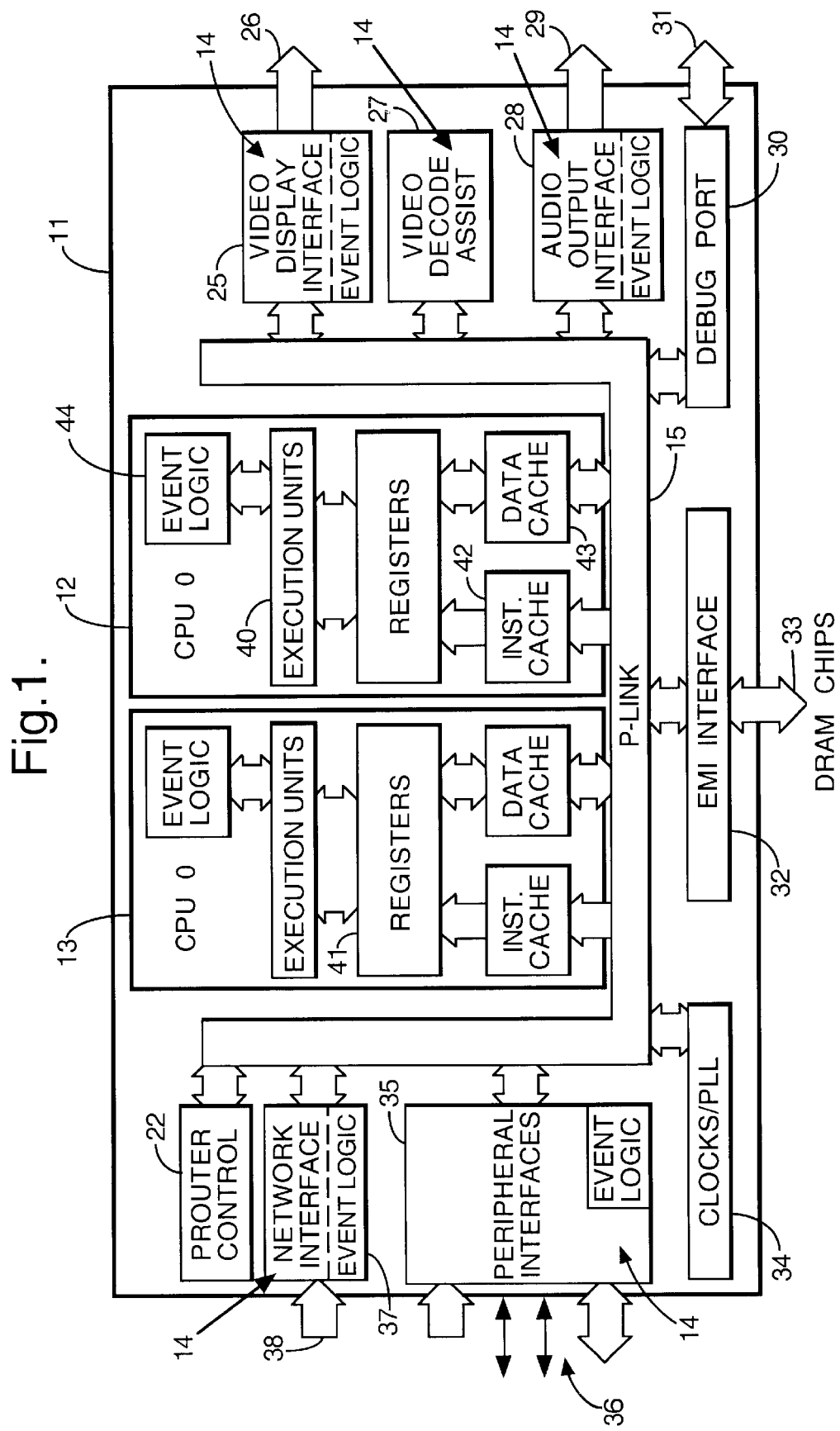
FIG. 1 is a block diagram of a microcomputer chip in accordance with the present invention.
Figure 18:
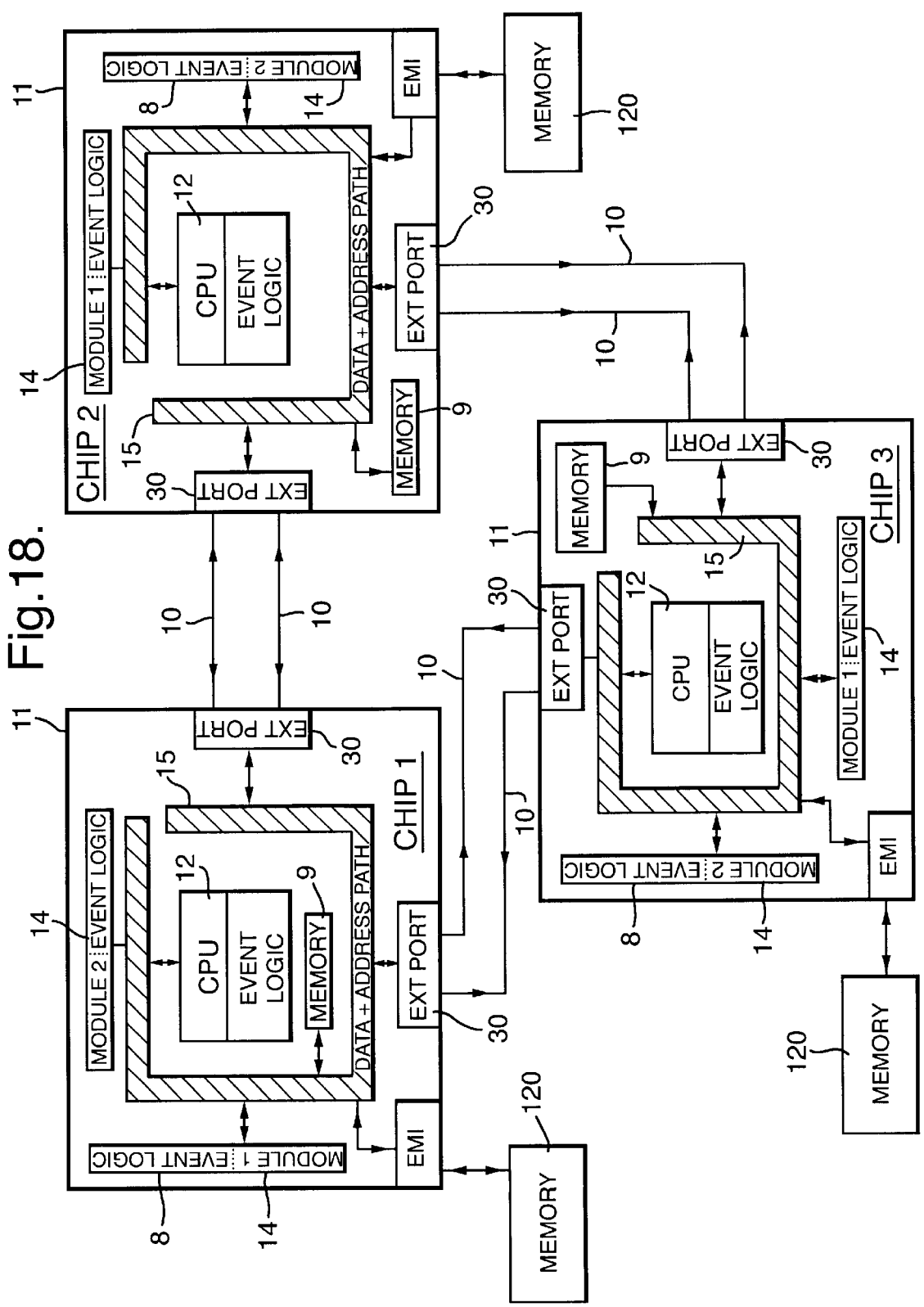
FIG. 18 shows a block diagram of three interconnected integrated circuit CPU devices in accordance with the invention.

The integrated circuit devices of this embodiment are illustrated in FIGS. 1 and 18. FIG. 1 shows a single chip whereas FIG. 18 shows three chips interconnected through external ports 30 by wires 10 carrying serial bit packets. On each chip 11 a CPU 12 is connected to a plurality of modules 14 by a data and address path 15 arranged to carry bit packets in parallel form. The modules 14 as well as the CPU 12 include event logic used in the distribution of bit packets on the path 15. Three types of packet are used on the data and address path 15, each including a destination indicator to indicate the required destination device connected to the path 15. The packets include data transfer packets which are necessary for memory access operations. In addition there are event packets of two types. Normal event packets form prioritised interrupts which may be received the CPU or module with the recipient selectively deciding whether, or when, to respond to the event packet depending on relative priority with other activities requested at that device. Special event packets form command control signals which must be acted on by the recipient device when the special event packet is received. In this embodiment modules 14 as well as the CPU 12 have event logic for handling event packet formation and receipt including normal events acting as interrupt requests as well as special events acting as control commands. In the example shown in FIG. 18 each chip 11 includes on-chip memory as well as off-chip memory 120. Although in FIG. 18 each chip includes a single CPU 12 more than one CPU may be provided on the same chip as shown in FIG. 1.

Figure 2:
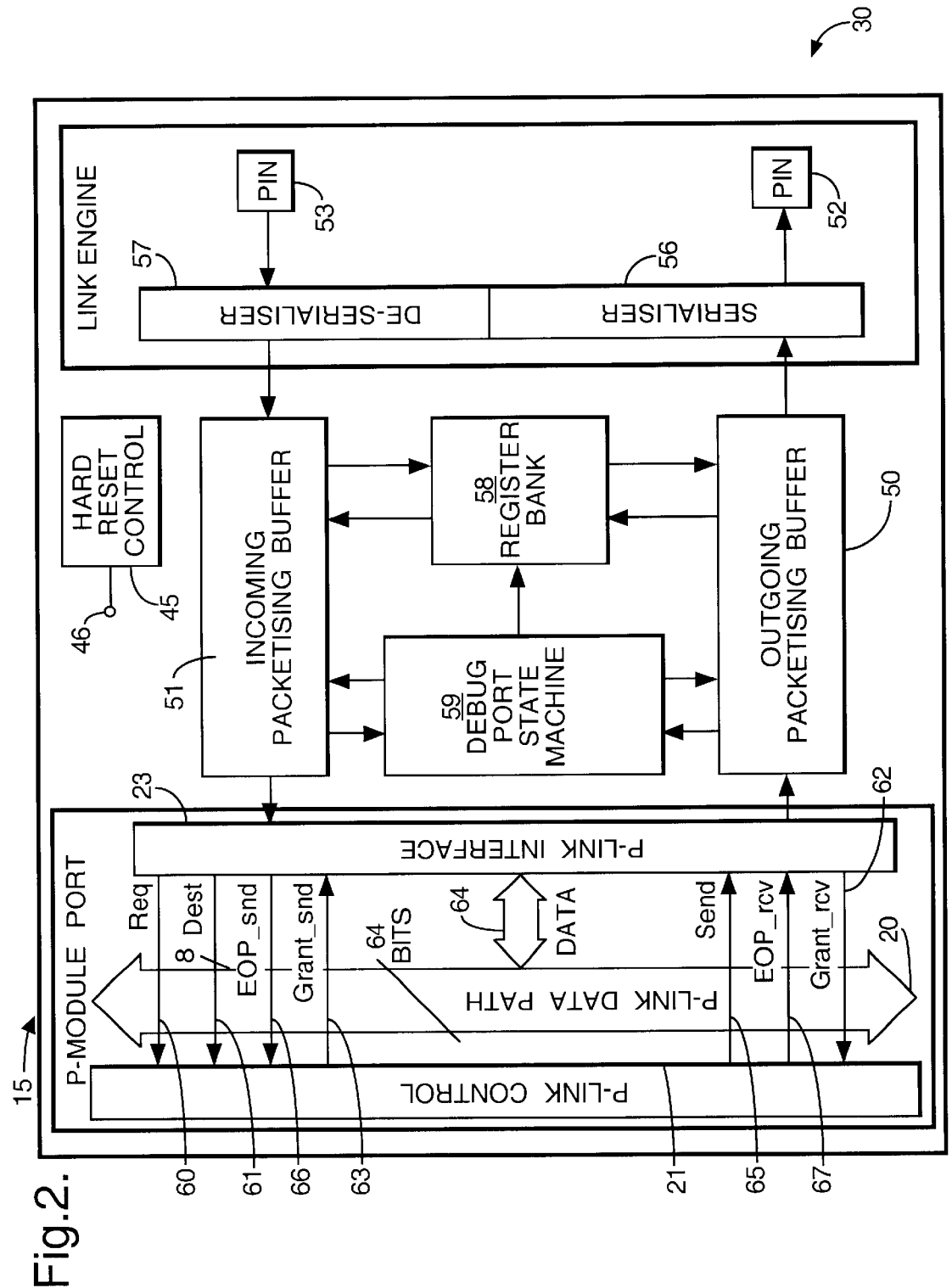
FIG. 2 shows more detail of a debug port of the microcomputer of FIG. 1.

The preferred embodiment illustrated in FIG. 1 comprises a single integrated circuit chip 11 on which is provided two CPU circuits 12 and 13 as well as a plurality of modules 14. The CPU's 12 and 13 as well as each module 14 are interconnected by a bus network 15 having bi-directional connections to each module. In this example the bus network is referred to as a P-link consisting of a parallel data bus 20 as shown in FIG. 2 together with a dedicated control bus 21 provided respectively for each module so as to link the module to a P-link control unit 22. Each module is provided with a P-link interface 23 incorporating a state machine so as to interchange control signals between the respective P-link control line 21 and the interface 23 as well as transferring data in two opposing directions between the data bus 20 and the interface 23.

In the example shown in FIG. 1, the various modules 14 include a video display interface 25 having an external connection 26, a video decode assist circuitry 27, an audio output interface 28 having an external connection 29, a debug port 30 having an external connection 31, an external memory interface 32 having an external bus connection 33 leading to an external memory, clock circuitry 34, various peripheral interfaces 35 provided with a plurality of bus and serial wire output connections 36, a network interface 37 with an external connection 38 as well as the P-link control unit 22. The two CPU units 12 and 13 of this example are generally similar in construction and each includes a plurality of instruction execution units 40, a plurality of registers 41 an instruction cache 42 and a data cache 43. In this example each CPU also includes event logic circuitry 44 connected to the execution units 40, and the other modules connected to the P-link each include event logic 8 for handling both normal event and special event packets. The P-link 15 is arranged to transmit to modules on the link and to the external memory interface both request and response packets, including memory access transactions, interrupts in the form of normal events, and control signals in the form of special events. These packets may be generated by software as a result of instruction execution by a CPU or by hardware responsive to detecting of an event. The packets may be generated on chip and distributed on the link 15 or generated off chip and supplied to the on chip link 15 through an external port such as the debug port 30.

The CPU's can be operated in conventional manner receiving instructions from the instruction caches 42 on chip and effecting data read or write operations with the data cache 43 on chip. Additionally external memory accesses for read or write operations may be made through the external memory interface 32 and bus connection 33. The debug port 30 is described in more detail in FIGS. 2 to 5. As shown in FIG. 2, this circuitry includes a hard reset controller 45 connected to a hard reset pin 46. The controller 45 is connected to all modules on the chip shown in FIG. 1 so that when the hard reset signal is asserted on pin 46 all circuitry on the chip is reset.

As will be described below, this port 30 provides an important external communication which may be used for example in debugging procedures. The on-chip CPU's 12 and 13 may obtain instruction code (by memory access packets) for execution from an external source communicating through the port 30. Furthermore, event packets providing either interrupts or control signals may be put onto the P-link 15 from an external chip via the port 30. Communications on the P-link system 15 are carried out in bit parallel format. Transmissions on the data bus 20 of the P-link 15 may be carried out in multiple byte packets, for example 35 bytes for each packet, so that one packet is transmitted in five consecutive eight byte transfers along the P-link each transfer being in bit parallel format. The port 30 is arranged to reduce the parallelism of packets obtained from the P-link 15 so that they are output in bit serial format from the output 31 or alternatively in a much reduced parallel format relative to that used on the P-link 15 so as to reduce the number of external connection pins needed to implement the external connection 31.

The structure of the port 30 will now be described with reference to FIGS. 2 to 5.

In this example the port 30 comprises an outgoing packetising buffer 50 connected to the P-link interface 23 as well as an incoming packetising buffer 51 connected to the interface 23. On the output side, the external connection 31 is in this case formed by an output pin 52 and an input pin 53. The port in this case effects a full transition between parallel format from the data bus 20 to bit serial format for the input and output pins 52 and 53. The pins 52 and 53 are connected as part of an output link engine 55 which also incorporates serialiser 56 and de-serialiser 57 connected respectively to the outgoing packetising buffer 50 and the incoming packetising buffer 51. Between the buffers 50 and 51 are connected by bidirectional connections a register bank 58 and a port state machine 59. The function of the port 30 is to translate bit packets between the internal on-chip parallel format and the external bit serial format. In addition it allows packets which are input through pin 53 to access the registers 58 in the port without use of the P-link system 15. Equally packets on the P-link system 15 can access the registers 58 of the port without using the external pins 52 or 53.

Figure 6:
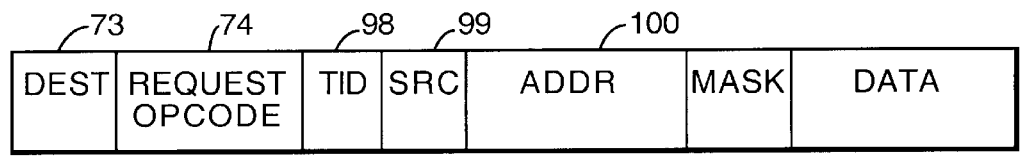
FIG. 6 shows the format of a digital signal request packet which may be used in the microcomputer of FIG. 1.
Figure 7:
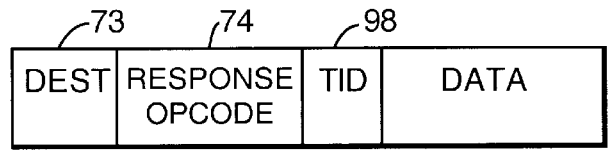
FIG. 7 shows the format of a digital signal response packet which may be used in the microcomputer of FIG. 1.
Figure 8:
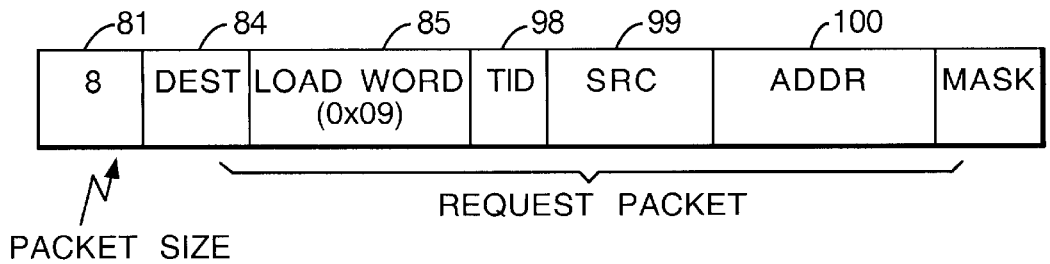
FIG. 8 shows one example of a serial request packet which may be output or input through the port of FIG. 2.

The format of the multibit packets used on the P-link system 15 in the microcomputer are illustrated by way of example in FIGS. 6, 7 and 8. FIGS. 6 and 7 show packet formats used in parallel form on the P-link whereas FIG. 8 shows a packet similar to that of FIG. 6 including a length indication when the packet is in serial form. When a packet is to be output from the port 30 from one of the modules 14 connected to the P-link 15, the module transmits the parallel representation of the packet along the data bus 20. The packet may comprise a plurality of eight byte transfers as already described. Each module 14, including the port 30, have a similar P-link interface 23 and the operation to take data from the bus 20 or to put data onto the bus 20 is similar for each. When a module has a packet to send to another module, for example to the port 30, it first signals this by asserting a request signal on line 60 to the dedicated link 21 connecting that module to the central control 22. It also outputs an eight bit signal on a destination bus 61 to indicate to the control the intended destination of the packet it wishes to transmit. It will be understood that the P-link 21 is itself a bus. A module such as the port 30, which is able to receive a packet from the bus 20 will assert a signal "grant receive" on line 62 to be supplied on the dedicated path 21 to the central control 22 regardless of whether a packet is available to be fed to that destination or not. When the central control 22 determines that a module wishes to send a packet to a destination and independently the destination has indicated by the signal on line 22 that it is able to receive a packet from the bus 20, the control 22 arranges for the transfer to take place. The control 22 asserts the "grant send" signal 63 via the dedicated line 21 to the appropriate interface 23 causing the sending module to put the packet onto the P-link data path 20 via the bus 64 interconnecting the interface 23 with the data bus 20. The control 22 then asserts the "send" signal 65 of the receiver which signals to it that it should accept the transfers currently on the P-link data bus 20. The packet transmission concludes when the sender asserts its "end of packet send" line 66 concurrently with the last transfer of packet data on the bus 20. This signal is fed on the dedicated path 21 to the central control 22 and the control then asserts the "end of packet received" signal 67 to the receiving module which causes it to cease accepting data on the P-link data bus 20 after the current transfer has been received.

Figure 4:
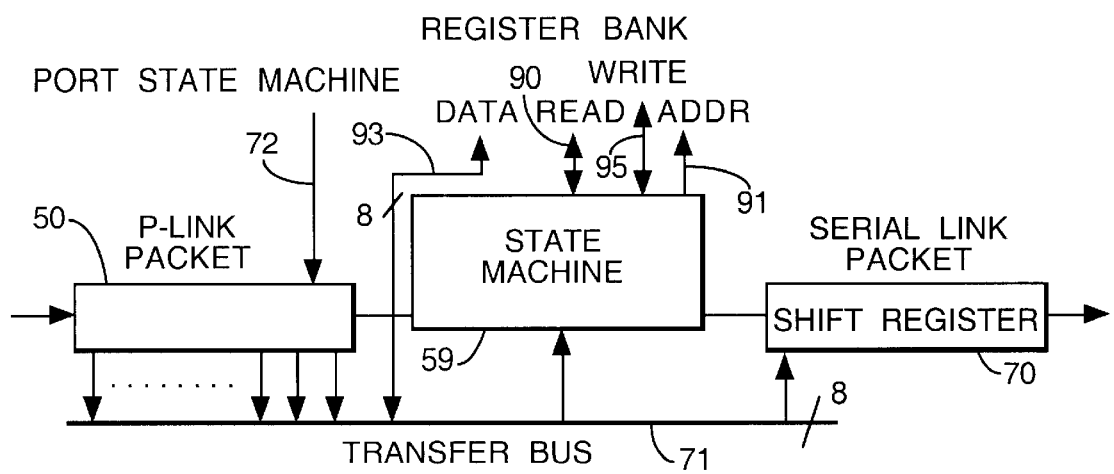
FIG. 4 shows the output of a digital signal packet to the port of FIG. 2.

The parallel to serial translation which takes place in the port 30 has a one to one equivalence between the parallel and serial packets so that all data contained in one packet form is contained in the other. The translation therefore involves identifying the type of the packet and copying across fields of the packet in a manner determined by the type. When a packet is input to the outgoing packetising buffer 50 from the data bus 20, the packet is held in its entirety as the buffer is 35 bytes long in order to hold the longest packet. As shown in FIG. 4, buffer 50 is connected to the port state machine 59 and to a shift register 70 by a transfer bus 71. The shift register 70 is connected to the serialiser 56. The state machine 59 provides input signals 72 to the buffer 50 to copy specific bytes from the P-link packet onto the transfer bus 71 under the control of the state machine 59. Firstly the most significant byte of the packet, which holds the destination header 73, is placed onto the byte wide transfer bus 71. The state machine 59 compares this value with those values which indicate that the packet is destined for the shift register and output serial link. If the packet is destined for the output serial link, the state machine causes the next byte 74 of the packet (which is the operation code indicating the type of packet) to be placed on the transfer bus 71. From the opcode 74 which is supplied to the state machine 59 on the transfer bus 71, the state machine determines the length and format of the packet derived from the data bus 20 and therefore determines the length and format of the serial packet which it has to synthesise. The state machine 59 outputs a byte which indicates the serial length packet onto the transfer bus 71 and this is shifted into the first byte position of the shift register 70. The state machine 59 then causes bytes to be copied from the buffer 50 onto the bus 71 where they are shifted into the next byte position in the shift register 70. This continues until all the bytes from the buffer 50 have been copied across. The order of byte extractions from the buffer 50 is contained in the state machine 59 as this determines the reformatting in serial format. The serial packet may then be output by the output engine 55 via pin 52 to externally connected circuitry as will be described with reference to FIGS. 11 to 14.

Figure 3:
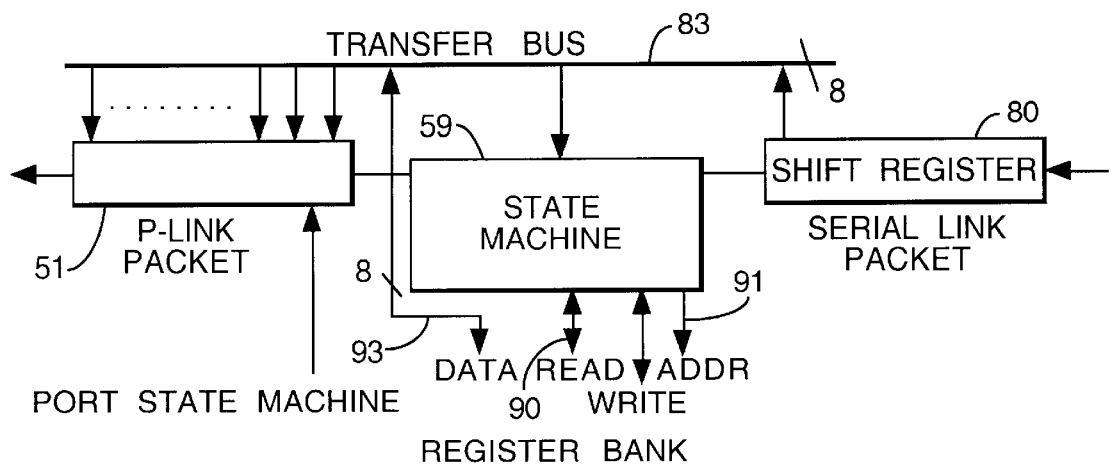
FIG. 3 shows input of a digital signal packet through the port of FIG. 2.

When a serial packet is input through pin 53 to the port 30, the translation is dealt with as follows. Each byte is passed into the shift register 80 forming a packetising buffer. Such a serial packet is shown in FIG. 8 in which the first byte 81 indicates the packet size. This will identify the position of the last byte of the packet. Referring to FIG. 3, the register 80 copies bytes in the simple order they are shifted out of the shift register onto a transfer bus 83 under the control of the state machine 59. The state machine 59 compares the destination byte 84 of the packet with those values which indicate that the packet is destined for the P-link system 15. The state machine 59 causes the next byte 85 of the packet to be placed on the transfer bus in order to indicate the type of packet (also known as the opcode) and from this the state machine checks the length and format of the serial link packet and those of the P-link packet which it has to synthesise. The state machine 59 causes bytes to be shifted out of the register 80 onto bus 83 where they are copied into a P-link packet buffer 51. This continues until all serial link bytes have been copied across and the positions in which the bytes are copied into the buffer 86 from the shift register 80 is determined by setting of the state machine 59. This indicates to the interface 23 that a packet is ready to be put on the bus 20 and the interface communicates through the dedicated communication path 21 with the central control 22 as previously described. When the P-link system 15 is ready to accept the packet the interface responds by copying the first eight bytes of the packet onto the data path 20 on the following clock cycle (controlled by clock 34). It copies consecutive eight byte parts of the packet onto the bus 20 on subsequent clock cycles until all packet bytes have been transmitted. The final eight bytes are concurrent with the end of packet sent signal being asserted by the interface on line 66.

As already described, an incoming packet (either parallel or serial) to the port 23 may wish to access port registers 58. When the destination byte 84 of an incoming serial bit packet from the pin 53 indicates that the packet is destined to access registers 58, the bit serial packet is changed to a P-link packet in buffer 51 as already described but rather than being forwarded to the P-link interface 23, it is used to access the register bank 58. One byte (the opcode) of the packet will indicate whether the register access is a read or write access. If the access is a read, then the state machine 59 will output a read signal on line 90 shown in FIG. 5. Concurrent with this the least significant four bits of the packet address field are placed on lines 91. Some cycles later the register bank 58 under control of a control block 92 will copy the value in the addressed register onto the data bus 93 one byte at a time, each byte on a successive clock cycle. Each byte on the data line 93 is latched into the outgoing buffer 50 and under control of the state machine 59, the data read from the register is synthesised into a P-link packet in buffer 50 and specified as a "load response". The destination field for this response packet is copied from a "source" field of a requesting bit serial packet. A transaction identifier (TID) which is also provided in each packet, is also copied across. A type byte of the response packet is formed from the type byte of the request packet and consequently a response P-link packet is formed in the outgoing buffer So in response to a request packet which was input from an external source to pin 53.

If the type of access for registers 58 is a write access then the write line 95 is asserted by the state machine 59 together with the address line 91. Some cycles later the least significant byte of the data is copied from an operand field of the packet in buffer 51 onto the data bus 93. On the following seven cycles bytes of successive significance are copied to the registers 58 until all eight bytes have been copied. A response packet is then synthesised in register 50 except that "store response" packets do not have data associated with them and comprise only a destination byte, a type byte and a transaction identifier byte. This response packet is translated into a bit serial response packet as previously described, loaded into shift register 70 and output through pin 52 to indicate to the source of the write request that a store has been effected.

Figure 5:
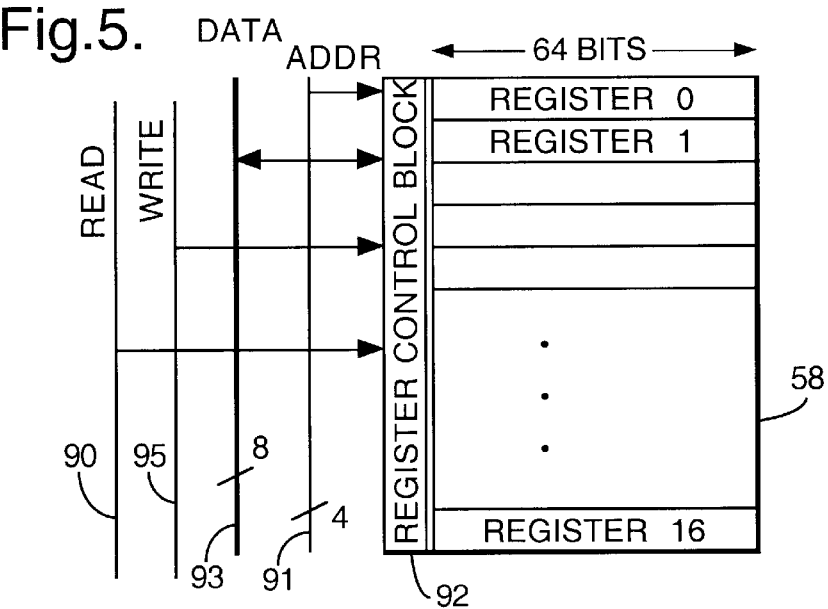
FIG. 5 shows accessing of registers in the port of FIG. 2.

Similarly if the destination byte of a packet received from the P-link system 15 by the port 30 is examined and indicates that the packet is destined to access registers 58 in the port 30, a similar operation is carried out. Rather than being forwarded to the bit serial register 70, the type of field of the packet is used to determine whether the access is a read or write access. If the access is a read then the read line 90 of FIG. 5 is asserted by the state machine 59 and the least significant four bits of the packets address field are placed on the address line 91. Two cycles later the register bank copies the value held in the register which has been addressed onto the data line 93 one byte at a time each on successive cycles. This is latched into buffer 51 and the state machine synthesises a P-link packet which is specified as a "read response" packet. The destination field for this response packet is copied from the source field of the requesting bit serial packet. The transaction identifier is also copied across. The type byte of the response packet is formed from the type byte of the request packet.

If the type of access required is a write access then state machine 59 asserts the write line 95 together with the address line 91. Some cycles later the least significant byte of the data is copied from the operand field of the packet in buffer 50 to the data line 93. On the following seven cycles bytes of successive significance are copied to the data lines 93 and copied into the registers until all bytes have been copied. A response packet is then synthesised as previously described except that "store response" packets do not have data associated with them and comprise only a destination byte, a type byte and a transaction identifier byte. This response packet is then forwarded to the P-link interface 23 where it is returned to the issuer of the request packet which have been input through the P-link interface 93 in order to access the port registers 58.

From the above description it will be understood that the packet formats shown in FIGS. 6, 7 and 8 include packets that form a request or a response to a read or write operation. In addition to each packet including a destination indicator for the packet (numeral 73 in FIGS. 6 and 7 or numeral 84 in FIG. 8) the packets include a (TID) transaction identifier 98 and an indication of the source 99. The packets may need to identify a more specific address at a destination. For this reason an address indicator 100 may be provided. As already described in relation to register access at the port 30, the destination identifies the port although the address 100 is used to indicate the specific register within the port. The Destination field is a one byte field used to route the packet to the target subsystem or module connected to the P link 15. For request packets it is the most significant byte of the address to be accessed. For a response packet it identifies the subsystem which issued the request. The source field is a one byte field which is used as a return address for a response packet. The Address field is provided by the least significant 3 bytes of the request address. The TID field is used by the requester to associate responses with requests. The TID enables a module to identify response packets corresponding to respective request packets in cases where a plurality of request packets have been sent before response packets have been received for each request packet.

It will be appreciated that by using a bit serial port low cost access is provided to a chip, requiring only a small number of pins for access, and may be particularly used for debugging a CPU by use of an external host.

In this example each CPU 12 and 13 is arranged to execute an instruction sequence in conventional manner. The instruction set will include a plurality of conventional instructions for a microcomputer, such as load and store used for memory accesses, but this example also includes an instruction to send an "event" packet. An "event" is an exceptional occurrence normally caused by circumstances external to a thread of instructions. An event packet may be sent by execution of an event instruction although hardware in the form of the event logic in any module connected to the P-link may generate some events and event packets without the execution of instructions in a service or handler routine.

Events which originate from execution of an instruction by a CPU are caused by execution of the event instruction. This can be used to send an "event" to a CPU such as one or other of the CPU's 12 or 13 on the same chip or it may be used to send an event to a CPU on a different chip through an external connection. The CPU which executes the event instruction may also send an event to a further module connected to the P-link system 15. The event instruction has two 64 bit operands, the event number and the event operand. With regard to the event number 0–63, bit 15 is used to determine whether or not the event is a "special event". A special event is used in a control signal packet to which a recipient module or CPU must respond regardless of the priority level at which the CPU is currently operating. When bit 15 is set to 1, bits 0–14 are used to define the type of special event. Bits 16–63 of the event number are used to identify the destination address of the CPU or module to receive the special event. The bit numbers referred to above in the event number may be mapped to different locations in the packet as shown in FIG. 6. For example, the opcode identifying the packet as an event request will be located at byte position marked 74 in FIG. 6 but the bits determining the type of event (EN code) will be positioned in the address section 100 as this is not needed for extra address indication in the case of an event packet. The types of special event are set out below:

| Event Name | EN. CODE | EN. OPERAND | Function | | |
|---|---|---|---|---|---|
| EVENT. RUN | 1 | Ignored | Resumes execution from suspended state of the receiving CPU | | |
| EVENT. RESET | 3 | Ignored | Generate a reset event on the receiving CPU | | |
| EVENT. SUSPEND | 5 | Ignored | Suspends execution of the receiving CPU | | |
| EVENT. SET RESET. HANDLER | 7 | boot address | RESET. HANDLER SHADOW RESET. HANDLER | ← | RESET HANDLER |
| | | | RESET. HANDLER | ← | boot address |

These special events may be sent from one CPU 12 or 13 to the other or alternatively they may be sent through the debug port 30 from an external host to either of the CPU's 12 or 13 on chip. The "event" will be sent as a bit packet of the type previously described.

In response to a special event, which acts as a CPU control packet, either CPU 12 or 13 can be made to cease fetching and issuing instructions and enter the suspended state.

When an EVENT.SUSPEND is received by a CPU it sets a suspend flag. This flag is OR-ed with the state of the suspend pin to determine the execution stage of the CPU.

The suspended state may be entered by:

Asserting the SUSPEND PIN. This stops all CPUs on the chip.

Sending an EVENT.SUSPEND to a CPU. This suspends only the receiving CPU.

The suspended state may be exited by either of:

Changing an external SUSPEND PIN from the asserted to negated stage. This causes all CPU(s) which do not have their suspend flags set to resume execution.

Sending an EVENT.RUN special event to a CPU. This clears the suspend flag. If the SUSPEND PIN is negated this causes the receiving CPU to resume execution.

Entering the suspended state causes a CPU to drain the execution pipelines. This takes an implementation defined period of time. While a CPU is suspended its execution context may be changed in any of the following ways:

The reset address control register RESET.HANDLER may be changed.

The CPU may be reset.

External memory may be changed by DMA, e.g. using the debug link 30.

At hard reset, (that is reset of all state on the chip) if the SUSPEND PIN is asserted at the active edge of the hard reset the CPU(s) state will be initialized but will not boot. The CPUs will boot from the addresses contained in the RESET.HANDLER set prior to the reset event when they enter the running state.

The EVENT.RESET causes the receiving CPU to perform a soft reset. This type of reset causes the key internal state to be initialized to known values while saving the old values in dedicated shadow registers such as to enable debugging software to determine the state of the CPU when the reset took place.

Figure 9:
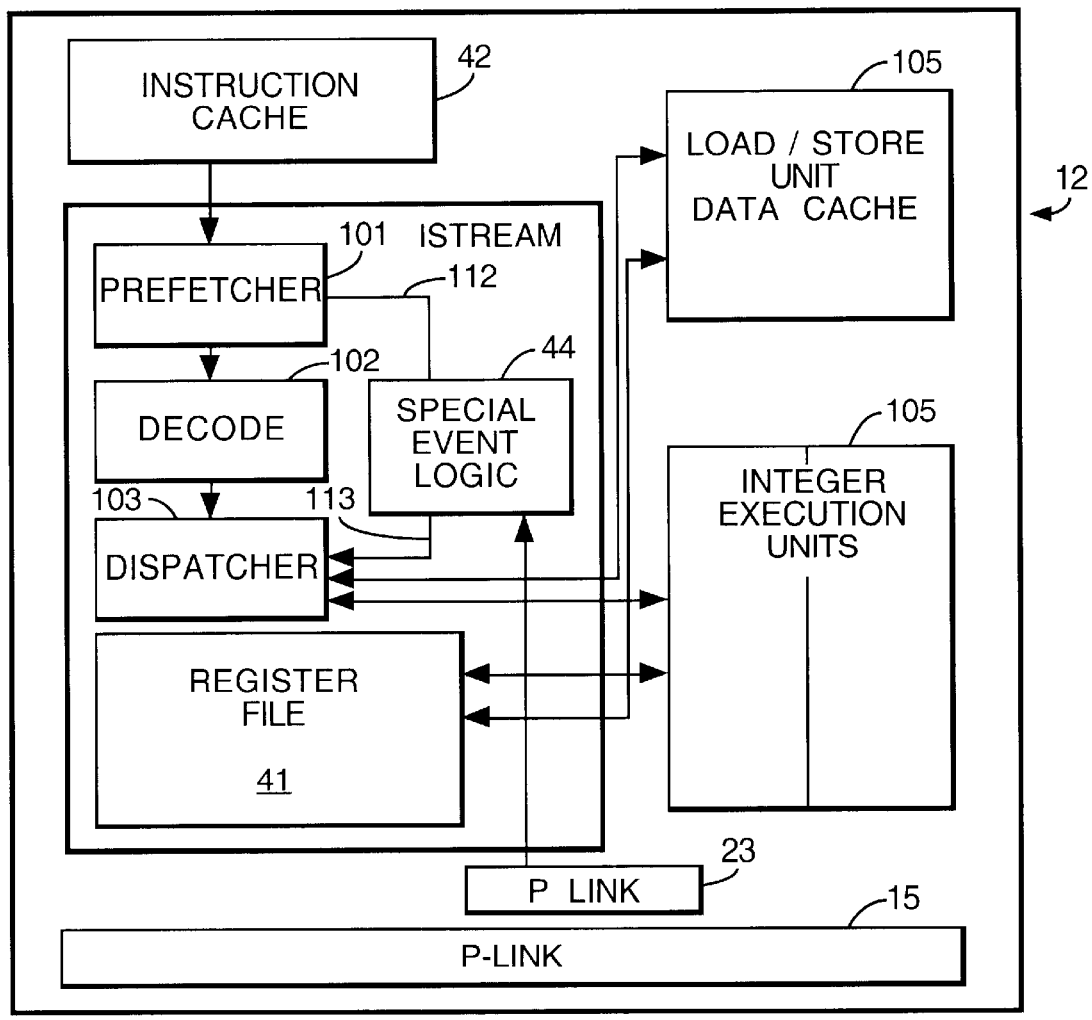
FIG. 9 illustrates further details of one CPU of the microcomputer of FIG. 1 including special event logic.

The instruction execution system for CPU 12 or 13 and its relation with the special event logic unit 44 will be described with reference to FIG. 9. In normal operations the CPU fetch and execute instruction cycle is as follows. A prefetcher 101 retrieves instructions from the instruction cache 42 and the instructions are aligned and placed in a buffer ready for decoding by a decode unit 102. The decode unit 102 standardises the format of instructions suitable for execution. A despatcher circuit 103 controls and decides which instructions are able to be executed and issues the instructions along with any operands to the execution unit 104 or a load/store unit 105. The microcomputer chip of this embodiment has in addition the special event logic 44. This unit 44 can accept commands which originate from packets on the P-link system 15 through the interface 23 so as to override the normal instruction fetch sequence. On receipt of an "event suspend" packet the special event logic 44 will cause the prefetcher 101 to cease fetching instructions and cause the despatcher 103 to cease despatching instructions. The execution pipeline of instructions is flushed. A "event run" packet will cause the special event logic 44 to cause the prefetcher to resume fetching instructions provided the suspend pin is not asserted. In addition to stopping or starting normal execution instruction, the special event logic 44 can cause the "instruction stream" state to be reinitialized by a soft reset which is initiated by software when the chip is already running and resets only some of the state on the chip. Furthermore a packet can overwrite the register which holds the address on which code is fetched following a reset operation.

The special event logic 44 will now be described in greater detail with reference to FIG. 10.

Figure 10:
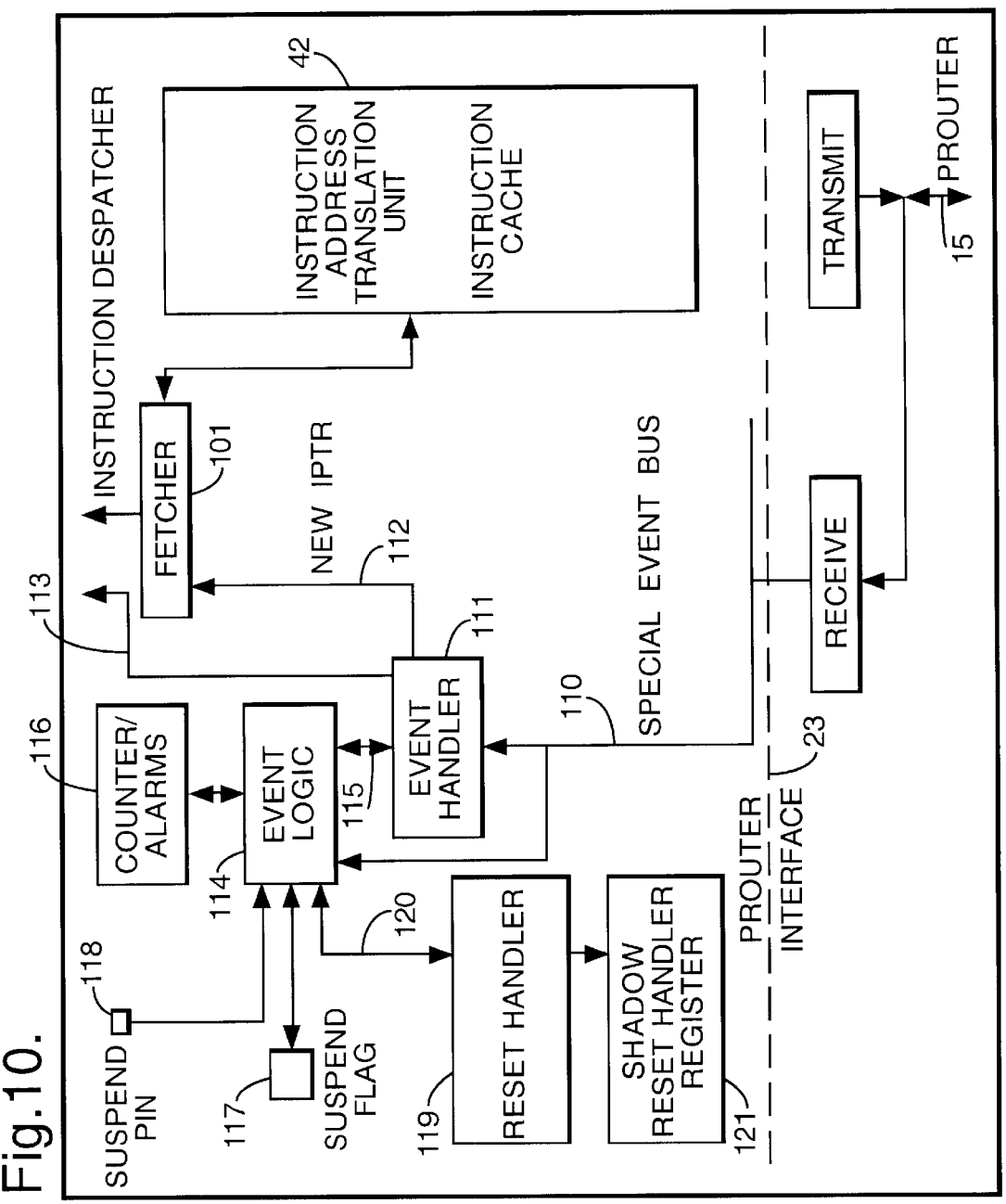
FIG. 10 shows further detail of the special event logic of FIG. 9.

FIG. 10 shows the special event logic 44 connected through the link interface 23 to the P-link system 15. As is shown in more detail in FIG. 10, the interface 23 is connected through a bus 110 to the special event logic 44 which comprises in more detail the following components. An event handler circuit 111 which is connected by line 112 to the instruction fetching circuitry 101 and by line 113 to the instruction despatcher 103. The bus 110 is also connected to event logic circuitry 114 which has a bi-directional communication along line 115 with the event handler circuit 111. The event logic circuitry 114 is connected with a bi-directional connection to counter and alarm circuitry 116 as well as a suspend flag 117. A suspend pin 118 is connected to the event logic 114. A reset handler register 119 has a bi-directional communication with the event logic 114 along line 120. It is also connected to a shadow reset handler register 121.

The operation of the circuitry of FIG. 10 is as follows. An instruction may be executed on-chip or be derived from operation of circuitry on an external chip, which causes a packet to be transmitted on the P-link system 15 having a destination indicator identifying the module shown in FIG. 10. In that case the packet is taken through the interface 23 along bus 110 to the event handler 111 and event logic 115. The event logic determines whether the special event is "event run" or "event reset" or "event suspend" or "event set reset handler".

On receipt of an "event suspend" the event logic 114 causes the suspend flag 117 to be set. The event logic 114 forms a logical OR of the state of the suspend flag 117 and the state of the suspend pin 118. The result is referred to as the suspend state. If the arrival of the "event suspend" has not changed the suspend state then nothing further is done. If the arrival of the "event suspend" has changed the suspend state then the event logic 114 inhibits the accessing of instructions from the cache 42, it does this by a signal to the event handler 111 which controls fetching of instructions by the fetcher 101 and the despatch of instructions by the despatcher 103. Instructions fetched prior to receipt of the "event suspend" will be completed but the CPU associated with the event logic 114 will eventually enter a state where no instructions are being fetched or executed.

On receipt of an "event run" the event logic 114 causes the suspend flag 117 to be cleared. The event logic 114 performs a logical OR of the state of the suspend flag 117 and the suspend pin 118. The result is known as the suspend state. If the arrival of the "event run" has not changed the suspend state then nothing further is done. If the arrival of the "event run" has changed the suspend state then the event logic 114 ceases to inhibit access of instructions from the cache 42. A signal passed through the event handler 111 indicates to the fetcher 101 that the CPU should resume its fetch-execute cycle at the point at which it was suspended.

In the event of receipt of an "event set reset handler" the event logic 114 causes the operand which accompanies the special event in the packet, to be copied into the reset handler register 119 and the previous value that was held in register 119 is put into the shadow reset handler register 121.

On receipt of an "event reset" the event logic 114 causes the event handler 111 to cease its current thread of execution by providing a new instruction pointer on line 112 to the fetcher 101 and thereby start executing a new instruction sequence whose first instruction is fetched from the address given in the reset handler register 199. That new address is obtained on line 120 through the event logic 114 to the event handler 111 prior to being supplied to the fetcher 101.

It will therefore be seen that by use of the special events which may be indicated in a packet on the P-link system 15, sources on-chip or off-chip may be used to suspend the fetching and execution of instructions by a CPU or to resume execution of a suspended CPU. It may also be used to reset a CPU into an initial state or to provide a new boot code for the CPU from anywhere on the P-link system or anywhere in an interconnected network using the external port 30 so that it forms part of the physical address space throughout the network which may be accessed by the CPU.

Figure 15:
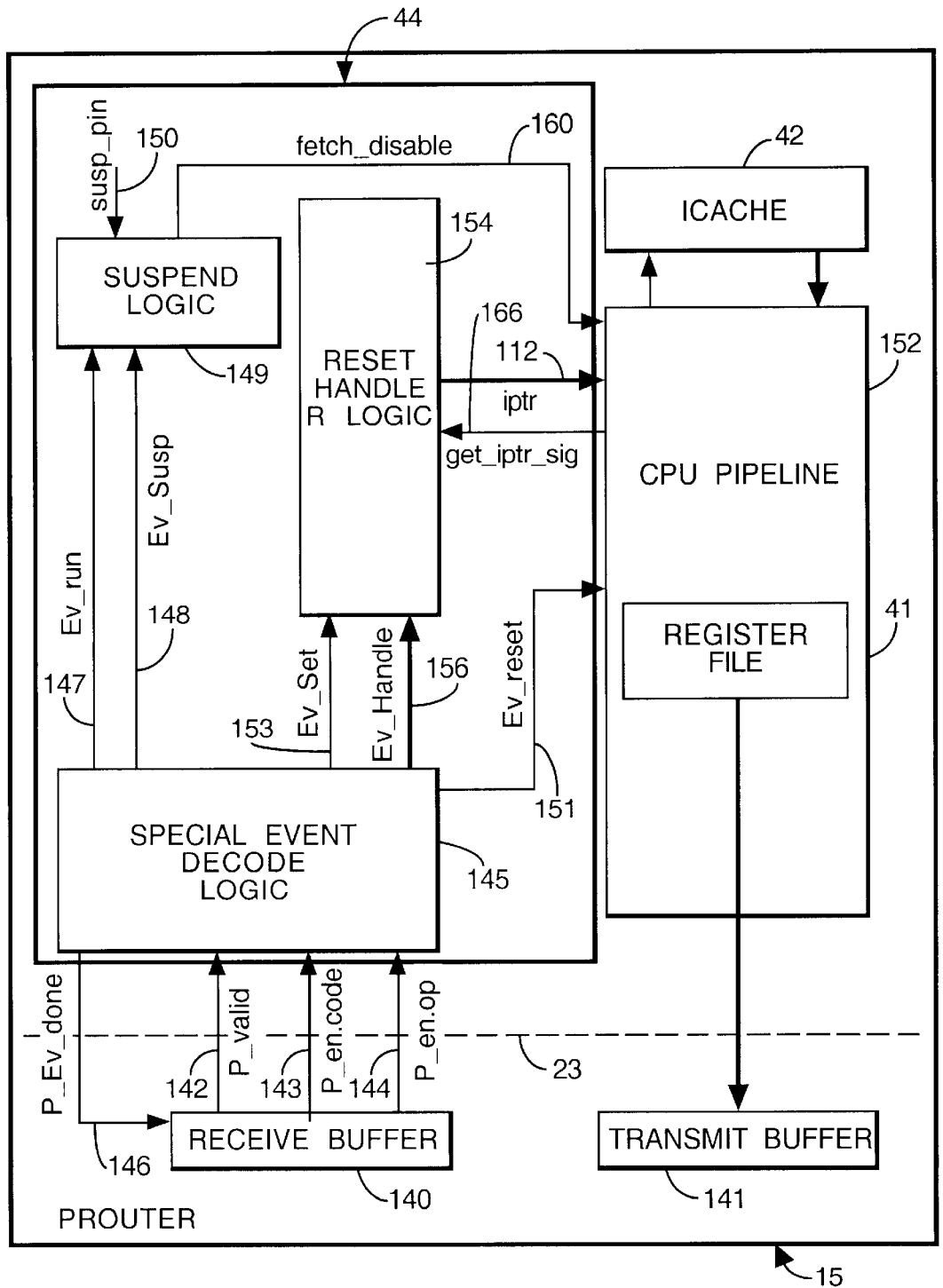
FIG. 15 shows more detail of part of the logic circuitry of FIG. 10.
Figure 16:
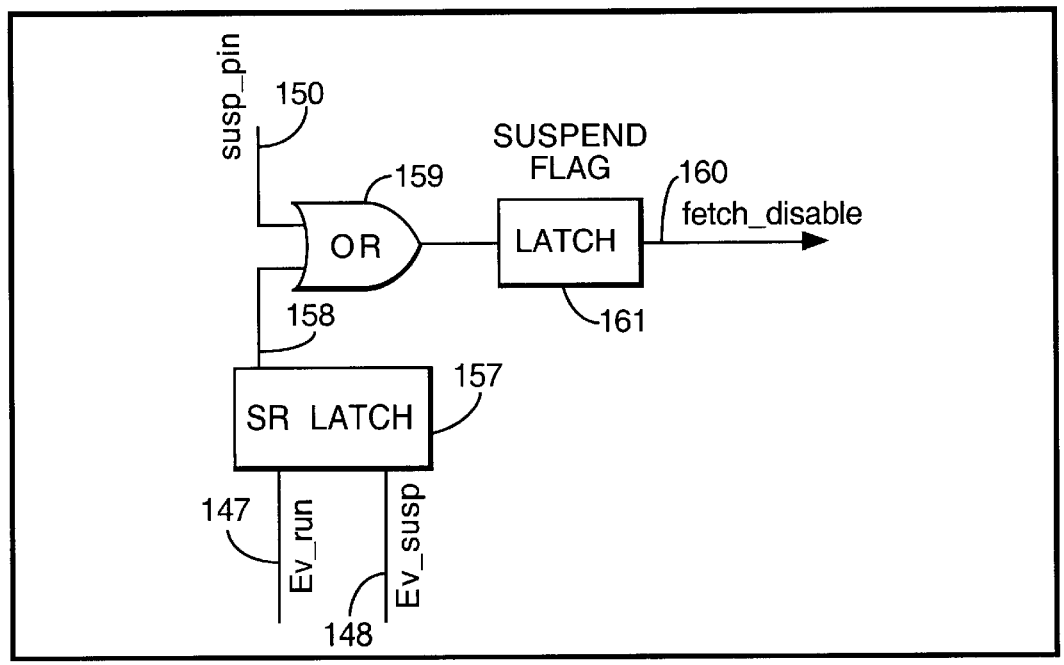
FIG. 16 shows more detail of part of the logic circuitry of FIG. 15.
Figure 17:
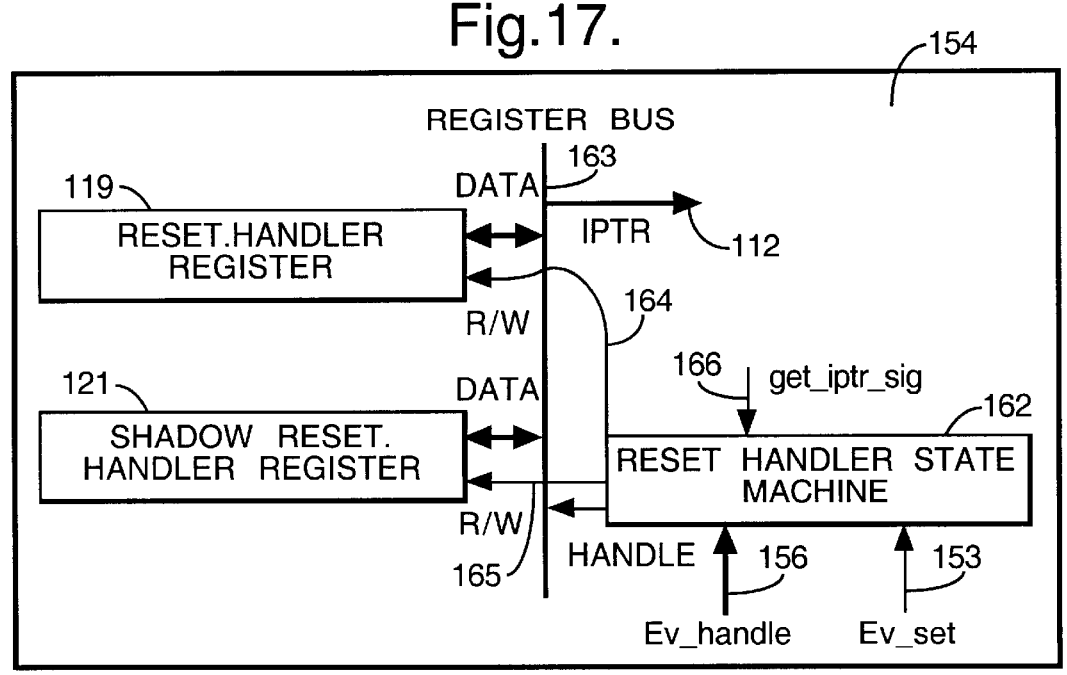
FIG. 17 shows more detail of another part of the logic circuitry of FIG. 15.

More detailed Figures showing the special event logic 44 are provided in FIGS. 15, 16 and 17. FIG. 15 shows the P-link system 15 including a Receive buffer 140 and a Transmit buffer 141 adjacent the interface 23. When a packet including a special event is received in the buffer 140, inputs may be provided on lines 142, 143 and 144 to special event decode logic 145. When bit 15 of the event number is set to 1 thereby indicating a special event, a P valid signal is provided on line 142 to the decode logic 145. At the same time the event code field of the packet is supplied on line 143 to the decode logic 145 and the event operand field is supplied on line 144 to the decode logic 145. In response to assertion of the P valid signal on line 142, the decode logic 145 decodes the event code field as indicated in the following table:

| P_en.code | Signal asserted | Ev_handle |
|---|---|---|
| 001 | Ev_run | — |
| 011 | Ev_reset | — |
| 101 | Ev_Susp | — |
| 111 | Ev_set | P_en.op |

On the cycle of operations following decoding, the decode logic 145 outputs a signal on line 146 P Event done to clear the buffer 140. Depending on the result of decoding the signal on line 143, the decode logic may output either an Event Run signal on line 147 or an Event Suspend signal on line 148 to suspend logic 149 connected to the suspend pin by line 150. Alternatively decoding of the signal on line 143 may cause the decode logic 145 to output an Event Reset signal on line 151 to the CPU pipeline circuitry 152. Alternatively the decode logic 145 may output an Event Set Reset Handler signal on line 153 to the reset handler logic 154 together with the operand value on bus 156.

FIG. 16 illustrates the suspend logic 149. Lines 147 and 148 form inputs to an SR latch 157 which provides a second input 158 to an OR gate 159 having the suspend pin providing the other input 150. In this way the signal on line 147 is logically or-ed with the suspend pin to generate a fetch disable signal on line 160 which includes a latch 161 providing the suspend flag. The signal on line 160 has the effect of inhibiting the fetching of instructions from the instruction cache 42. This eventually starves the CPU of instructions and the CPU execution will be suspended. Assertion of the signal on line 148 will clear any previously asserted signal on line 147 in the normal operation of the SR latch 157.

FIG. 17 illustrates the reset handler logic 154. When the Event Set on line 153 is asserted, this is supplied to a reset handler state machine 162 connected to a register bus 163 interconnecting the reset handler register 119, shadow reset handler register 121 and the instruction pointer bus 112. The response to assertion of signal 153 is as follows:
1 The state machine 162 asserts the read line 164 of the reset handler register 119 which causes the value in the reset handler register to be read onto the register bus 163.
2 The state machine 162 asserts the write line 165 of the shadow reset handler register 121 causing the value on the register bus to be written into the shadow reset handler register.
3 The state machine 162 causes the value on the Ev_handle bus 156 to be put onto the register bus.
4 The state machine 162 asserts the write line 164 of the reset handler register 119 which causes the value on the register bus to be copied into the reset handler register 119.

Alternatively if a get_iptr_sig is asserted on line 166 from the CPU pipeline 152 then the following occurs. The state machine 162 asserts the read line (R/W) of the reset handler register which causes the value in the reset handler register to be read onto the register bus. This value is transferred along the line labelled IPTR.

Figure 11:
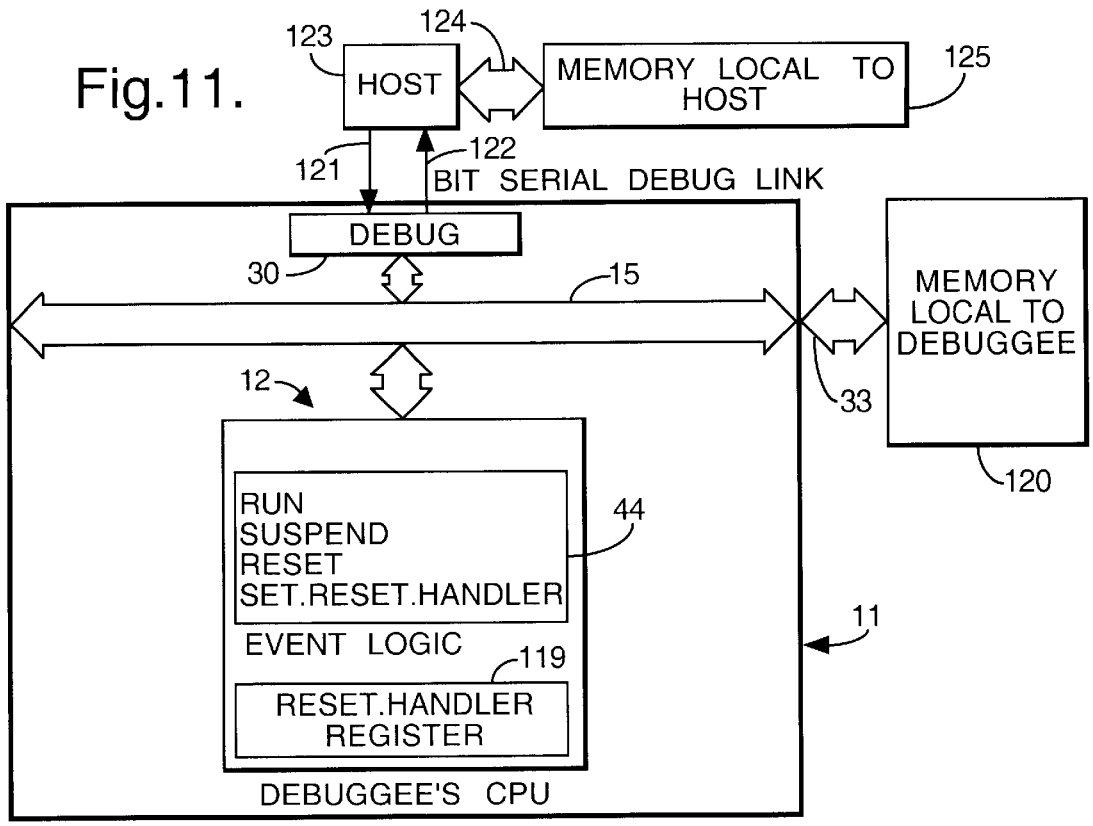
FIG. 11 shows a microcomputer of the type shown in FIG. 1 connected to a host computer for use in debugging the CPU by operation of the host.

The following method may be used to boot one or other of the CPUs 12 or 13 of FIG. 1 when the chip is connected to an external microcomputer through the port 30 similar to the arrangement shown in FIG. 11. The two CPUs 12 and 13 may be connected to a common suspend pin 118. When pin 118 is asserted, after the hard reset pin 46 has been asserted, both CPUs are prevented from attempting to fetch instructions. The external link 30 and external microcomputer 123 can then be used to configure the minimal on-chip state by writing directly to control registers on chip 11 and storing the necessary boot code into the DRAM memory connected to bus 33 of chip 11. When the state of the suspend pin is changed one of the CPUs can boot from the code now held in the DRAM for the chip 11. To achieve this, the suspend pin 118 is changed to an assert state after a hard reset has been asserted. The external microcomputer 123 sends packets through the port 30 to write boot code into memory 120 shown in FIG. 11. The host 123 then executes an instruction to send the special event EVENT SET RESET HANDLER to the selected one of microcomputers 12 or 13 and in this example it will be assumed to be CPU 13. This will provide a new target address in the reset handler register 119 for CPU 13. The host 113 will then execute an instruction to send through the port 30 a special event EVENT SUSPEND to the other CPU 12. This will set the suspend flag 117 of CPU 12. The assert signal on the suspend pin 118 is then removed so that CPU 13 will start executing code derived from memory 120 from the target boot address held in the reset handler register 119. CPU 12 will remain suspended due to the start of its suspend flag 117. When it is necessary to operate CPU 12, it can be started by CPU 13 executing an instruction to send to CPU 12 the special instruction EVENT SET RESET HANDLER. This will change the default boot address held in the reset handler register 119 of the CPU 12. CPU 13 must then execute an instruction to send the special event EVENT RUN to CPU 12 which will, as described above, start execution of CPU 12 with code derived from the address in the reset handler register 119 of CPU 12.

In this way the microcomputer of FIG. 1 can be booted without the requirement of having valid code in a ROM.

Although the above described boot procedure used boot code which had been loaded into the local memory 120 for the chip 11, the similar procedure may be followed using code located in the memory 125 which is local to the external microcomputer 123. To achieve this, the same procedure, as above, is followed except that the special event which is sent through port 30 to load the reset handler register 119 of CPU 13 will provide a target address for the boot code which is located in the address space of the port 30. In this way, when the assert signal is removed from the suspend pin 118, CPU 13 will start fetching code directly from the external computer and external memory. When CPU 12 is needed it can be started by CPU 13 as previously described.

By arranging for the host 113 to send the special instruction EVENT SUSPEND to CPU 12 prior to removing the assert signal from suspend pin 118 it is possible to reduce the amount of instruction fetching through the port 30 since CPU 13 may boot alone and then arrange for CPU 12 to boot rather than attempting to boot both CPUs 12 and 13 from the external microcomputer through the port 30.

Watchpoint registers may be used to monitor the execution of a program. These registers may be used to initiate a debug routine when a particular memory store is addressed or alternatively when instructions from a particular location are executed.

Various examples of use of the chip 11 in a network having a plurality of interconnected chips are shown in FIGS. 11 to 14.

In the example of FIG. 11, the chip 11 is shown for simplicity with the single CPU 12 as CPU 13 is not involved in the operation described with reference to FIG. 11. The chip is connected through the external memory interface and bus 33 to a memory chip 120 which is local to the CPU 12 and forms part of the local address space of the CPU 12. The port 30 is connected by two serial wires 121 and 122 to a further microprocessor chip 123 which in this case forms a debugging host for use with chip 11. Line 121 provides a unidirectional input path to chip 11 and line 122 provides a unidirectional output path to the host 123. The host 123 is connected through a bus 124 to a memory chip 125 which is local to the host microcomputer 123 and thereby forms part of the local address space of the host microcomputer 123. In order to carry out debugging operations on the CPU 12, the host microcomputer may operate software derived on-chip in the microcomputer 123 or from its local memory 125 so that the host 123 causes special events, as previously described, to be issued in packets along the serial line 121 through the port 30 onto the P-link system 15. These may have the destination address indicating the CPU 12 so that this special event is handled as already described with reference to FIG. 10. This may be used to suspend the CPU 12 at any time and to replace the value in its reset handler register and to reset the CPU 12 either from its previous state or from a new state indicated by the value in the register 119. The CPU 12 may have part of its address space located in addresses of the memory 125 local to the host 123. The port 30 forms part of the local address space for the CPU 12 and consequently a memory access may be made to the address space allocated to the port 30 and in this case the response may be synthesised by software running on the host microcomputer 123. It is therefore possible to set the reset handler register 119 to be an address local to the host rather than local to the CPU 12. In this way a host can, independently of operation of the CPU 12, establish itself as the source of the instructions and/or data to be used by the CPU 12. This mechanism may be used to initiate debugging from the host 123. In the case of a chip 11 having two CPUs 12 and 13, it is possible to debug software running on CPU 12 as already explained while leaving software running on CPU 13 unaffected by the debug operation being carried out on CPU 12. This is the position shown in FIG. 12 where the second CPU 13 is shown in broken lines and is operating normally in obtaining instructions from its instruction cache or from the memory 120 quite independently of the debug routine operating on CPU 12 in conjunction with the host 123.

Figure 12:
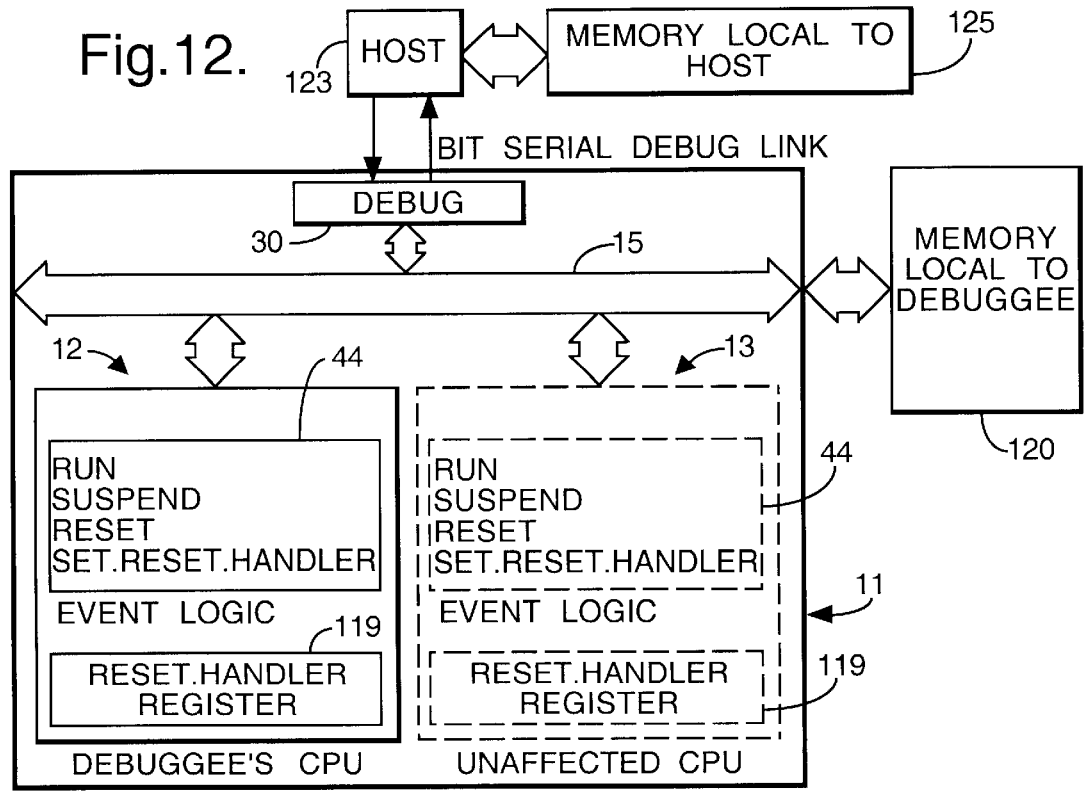
FIG. 12 shows an arrangement similar to FIG. 11 in which a second CPU is provided on the same chip and operates normally while the other CPU is debugged by the host.
Figure 13:
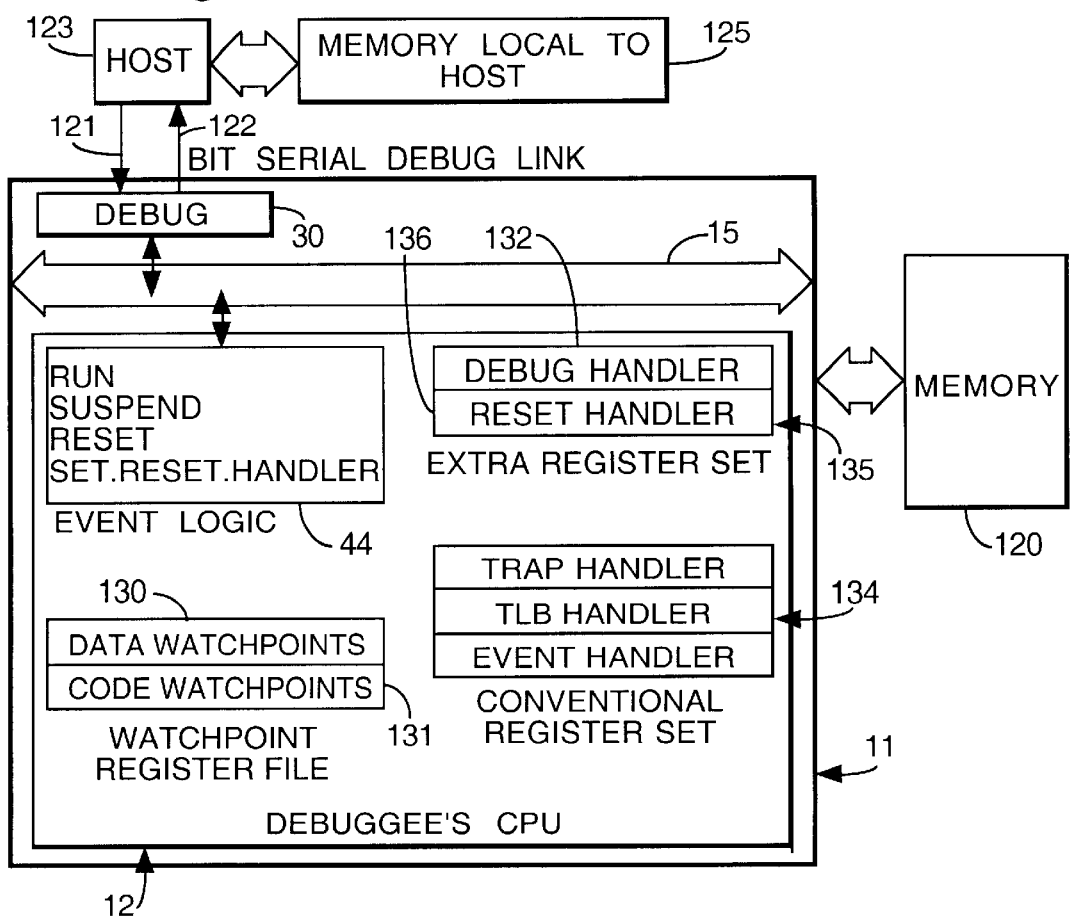
FIG. 13 illustrates one CPU forming part of a microcomputer as shown in FIG. 1 when connected to a host computer for use in watchpoint debugging.

FIG. 13 shows an alternative arrangement in which the network is generally similar to that described with reference to FIGS. 11 and 12. However in this case the CPU 12 is provided with a data watchpoint register 130 and a code watchpoint register 131 in which respective addresses for data values or instruction locations may be held so as to initiate a debug routine if those watchpoints are reached. In this example, the host microcomputer 123 can, at any point during the execution of a program by the CPU 12, briefly stop execution of the CPU 12 and cause the watchpoint state in the registers 130 or 131 to be modified and return control to the original program of the CPU 12. When the CPU 12 executes an instruction which triggers a watchpoint as set in either of the registers 130 or 131, it stops fetching instructions in its normal sequence and starts fetching and executing instructions starting from the instruction specified by the content of a debug handler register 132. If the debug handler register 132 contains an address which is local to the host 123 rather than local to the CPU 12, the CPU 12 will start fetching instructions from the host 123. In this way the host can establish the watchpoint debugging of a program which is already running without using any of the memory local to the CPU 12 and without requiring the program of the CPU 12 to be designed in a manner cooperative to that of the debugging host 123. In this way the examples described provides for non-cooperative debugging. The operating system and application software for the CPUs on the chip 11 do not need to have any knowledge of how the debugging host computer 123 will operate or what operating system or software is incorporated in the host 123.

In conventional computer architectures watchpoint triggers are handled using a vector common to traps or events managed by the operating system. These traps and events use a conventional set of registers marked 134 which provide the address of the handler routine. In the example described, an extra register set 135 is provided which includes the debug handler register 132 and a reset handler register 136. In this manner independence from the operating system is established by providing the extra register set 135 in which the address of the handler routine for watchpoint handling routines may be found.

Figure 14:
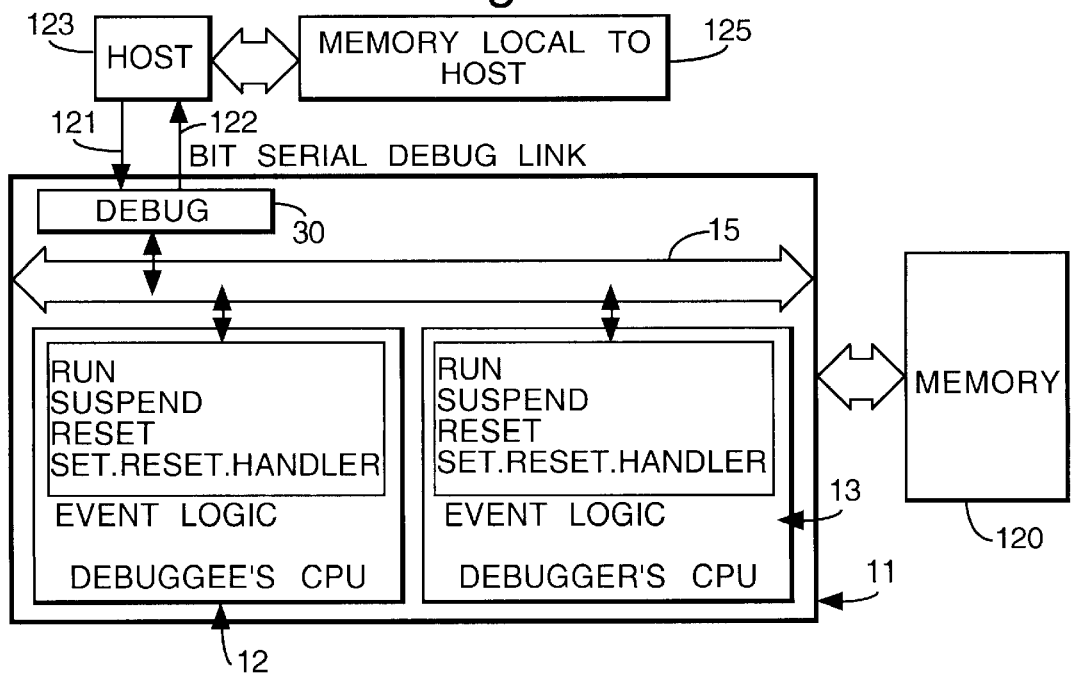
FIG. 14 shows a microcomputer of the type shown in FIG. 1 connected to a host computer in which one CPU on the microcomputer is debugged by the other CPU on the same chip.

FIG. 14 shows the same network as previously described with reference to FIG. 12. In this case the host 123 is provided and connected to the port 30 so that it may operate as previously described for use in debugging and the transmission of special events through the port 30. However in cases where it is necessary to monitor the debugging of one of the CPUs 12 or 13 as quickly as possible in debugging real time code, this example may be used to carry out debugging of one of the CPUs 12 or 13 by use of the other of the CPUs 12 or 13 instead of the host 123. The transfer of packets along the P-link 15 on-chip may be performed faster than external communications through the port 30. In this case either of the CPUs 12 or 13 may execute instructions which send special events to the other CPU on the same chip and thereby carry out a debugging operation as previously described with reference to use of the host 123 although in this case the control will be carried out by one of the on-chip CPUs in effecting a debugging operation of the other CPU on the same chip.

It will be seen that in the above example the external host 123 can be used to carry out debugging of either of the on-chip CPUs 12 or 13 without restrictions on the operating systems or application software of either of the on-chip CPUs. The watchpoint debugging may be carried out without the need to use memory local to the on-chip CPUs. Both on-chip CPUs 11 and 12 and the host 123 which is externally connected have access to each other's state by packet communications through the port 30. The on-chip CPUs 12 and 13 can access the external memory 125 independently of any operation of a CPU in the host 123. This allows the on-chip CPUs to access code from a memory which is local to an externally connected microcomputer.

The external host may comprise a computer or a computer device such as a programmable logic array.

As already explained with reference to FIGS. 1 and 18, the modules 14 as well as CPU's 12 and 13 include circuitry which may generate request packets and receive response packets covering data transfers that are involved in memory accesses as well as normal event packets acting as interrupts and special event packets acting as obligatory control commands for a recipient device. Each of these packets may be distributed on the data and address paths 15 which is common to all types of packet distributed on the same chip. The packets are distributed in parallel format on the path 15. The range of transactions covered by the packets are shown in the following table.

| Transaction | Request | | Ordinary Response | |
| --- | --- | --- | --- | --- |
| | Opcode | Packet Length | Opcode | Packet Length |
| LoadWord | 0x09 | 8 | 0x29 | 11 |
| Load2 | 0x0A | 7 | 0x2A | 19 |
| Load3of4 | 0x0B | 7 | 0x2B | 27 |
| Load4 | 0x0C | 7 | 0x2C | 35 |
| StoreWord | 0x11 | 16 | 0x31 | 3 |
| Store2 | 0x12 | 23 | 0x32 | 3 |
| Store3of4 | 0x13 | 31 | 0x33 | 3 |
| Store4 | 0x14 | 39 | 0x34 | 3 |
| Swap | 0x19 | 15 | 0x39 | 11 |
| Event | 0x01 | 16 | 0x21 | 3 |

This table shows in the left hand column the type of transaction which may be designated by the packet and will be identified by the Opcode 74 of each packet. A different Opcode and different packet length is used for request and response packets as shown in the above table. All transactions listed in the table are memory access transactions apart from the event transaction. Although FIG. 7 showed a general form of response packet it will be understood that various transactions including the event transaction do not require data in the response packet. The response packet merely confirms to the source that the request packet was received. The memory access transactions listed above includes "LoadWord" which reads up to 8 bytes of data from a memory location. Load2 transaction reads 16 bytes of data from a 16 byte aligned location in memory. Load3of4 transaction reads 24 bytes of data from a 32 byte aligned location in memory. Load4transaction reads 32 bytes of data from a 32 byte aligned location in memory. The various "Store" transactions are the equivalent transactions for writing multiple bytes of data into memory.

The event transaction may be a special event as already described. It may also be used to designate a normal event or interrupt. The request and response packets for LoadWord, StoreWord and Event are shown in FIGS. 21 to 24. Similar formats are used for the other transactions listed in the table above. Each includes a designation indicating byte for use by the P-router control 22 of FIG. 1 to ensure that the correct device connected to the P-link 15 receives the packet which is put on the address and data path 15. Each packet includes the Opcode adjacent the destination indicator so that the recipient may decode the nature of the transaction required. Similarly each request packet has a TID indicator and source indicator as already indicated so that the recipient device may decode the packets according to a common format and provide response packets which also have a common format for decoding by the source of the request packet.

In the case of the event transactions, the event request packet does not require the additional 3 bytes of address location provided in section 100 of FIG. 6. Consequently the bit pattern used to identify the type of event (corresponding to the significant bits of the Event number referred to in connection with the event instruction) are located in section 100 used for additional address information in the other types of transaction.

Each of the above transacting packets for use on the P-link 15 can be generated by a hardware operation such as the event logic in any of the modules or it may be generated in response to a software operation such as the execution of an instruction by the CPU. The format of the packets used on the P-link 15 is the same whether the packet is in response to a hardware operation or a software operation. The CPU 12 may execute an instruction such as an event instruction in order to directly generate a packet for use on the P-link 15. Alternatively it may execute an instruction which causes some other device to use hardware circuitry to generate a transaction packet of the type described above. In seeking instructions or data from the on-chip caches 42 or 43 it may be necessary to carry out a memory access operation in order to obtain data or instructions from memory which are not already in the respective cache. The cache control circuitry may then include circuitry similar to the event logic of the modules 14 so as to generate a memory access packet in response to the instruction execution by the CPU where the required instruction or data was not already found in the cache.

The instruction set of the CPU includes a plurality of load and store instructions corresponding to the various transactions listed in the table included earlier in the specification. The load and store instructions for memory accesses will generate a memory address using a base pointer with an index or offset. This will be used in the address portion of a request packet as previously described. The destination for such a packet will identify the interface of either an on-chip memory or an external memory. The type of instruction executed will determine the opcode of the packet.

The transaction packets which are distributed on the on-chip P-link 15 may be output or input through the debug port 30 from an external chip in a network of the type shown in FIG. 18. It will be understood that the transaction packet will then be changed from an on-chip parallel form to a serial bit form (or to a less serial bit form than that used in the parallel format on the on-chip P-link 15). The serial bit packet will as previously described include a packet length indicator for use in the serial transmission on wires 10 between adjacent chips. In the arrangement shown in FIG. 18 the network comprises two or more similar chips each having its own system of address and data path 15 with attached modules 15 and CPU 12. In this way, the address space used on any chip in the network can be accessed directly by any other chip in the network so that each P-link connected in the network provides part of a commonly accessible address space. To distinguish between similar addresses on different chips, the P-router control 22 of each chip may include a plurality of look-up tables corresponding to the number of chips in the network. The P-router control may be reset to a look-up table providing addresses for its own on-chip addresses while the CPU may enable access to a different look-up table corresponding to a different chip in order to use a packet destination address which identifies the correct destination on an interconnected chip accessible through the external port of the chip on which the source device is located. In this way the plurality of interconnected chips may use a common extended address space accessible by packets generated on any one chip with a destination address identifying a required destination on any interconnected chip.

Returning to the event packets, these will have a bit pattern extending over 2 bytes which identify the type of event as shown in the following table:

| Name | Bits | Function |
| --- | --- | --- |
| EN.VIP | 0–4 | Virtual Interrupt Pin to deliver event to. |
| EN.TYPE | 5–6 | 0 Edge event |
| | | 1 Level-on event |
| | | 2 Reserved |
| | | 3 Level-off event |

-continued

| Name | Bits | Function |
| --- | --- | --- |
| EN.CODE | 0–14 | Special event code |
| EN.SPECIAL | 15 | Whether the event is a special or soft-reset event. If zero, the event is a normal event so EN.VIP and EN.TYPE are valid but event.operand is not used. If one, the event is a special or soft-reset event, and EN.CODE and the event.operand are valid. |
| | 16–63 | Destination CPU/Device event address. |

Figure 25:
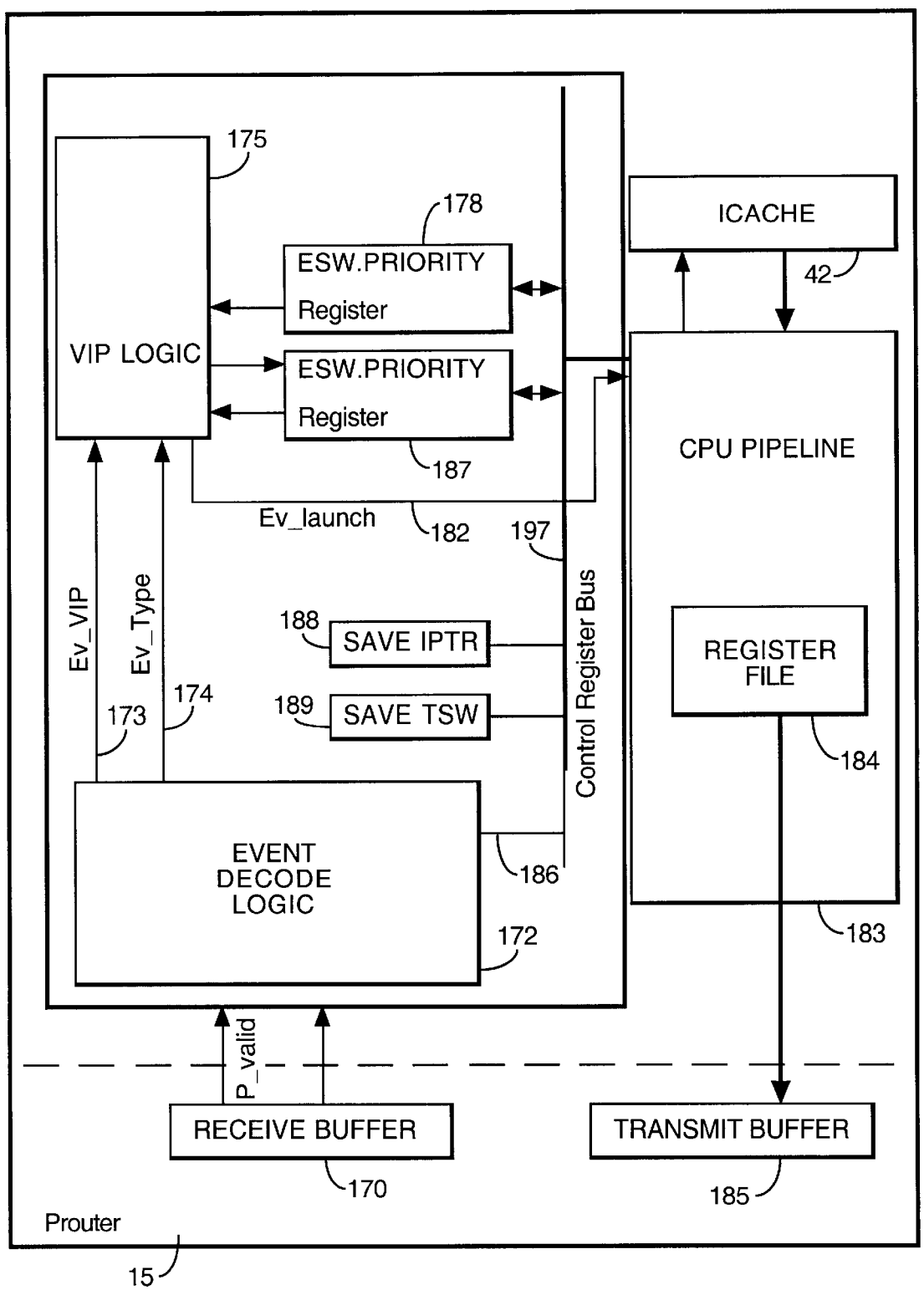
FIG. 25 shows more detail of event handling circuitry in a CPU of the type shown in FIGS. 1 and 18.
Figure 26:
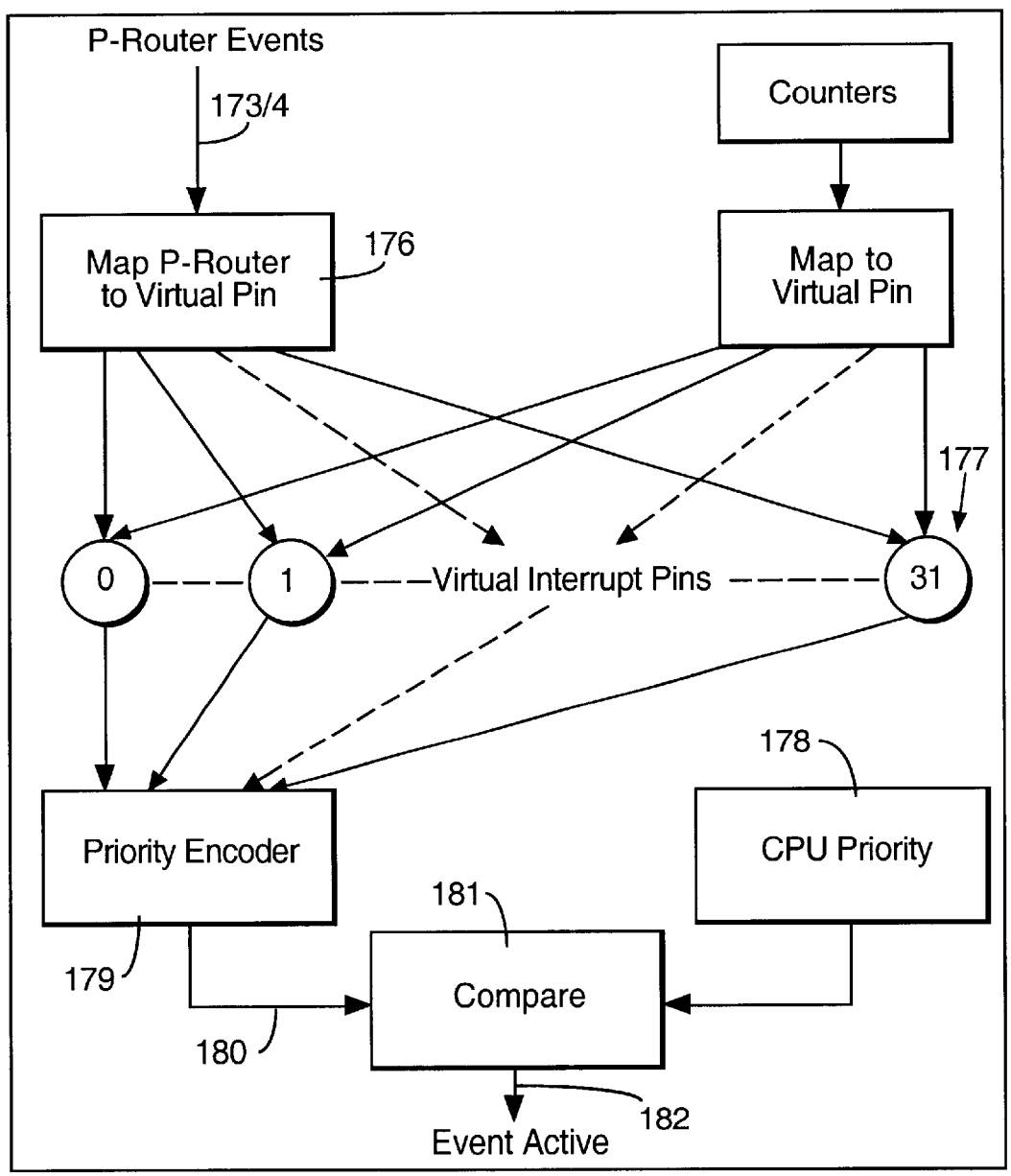
FIG. 26 shows a priority comparator used in the CPU's of FIGS. 1 and 18.

This bit pattern will be located, as previously described, in the address section 100 of the packet shown in FIG. 23. If the bit 15 is not zero then the event is a special Event as already described. If however bit 15 is zero then bits 0–6 identify the priority and type of a normal interrupt event to which the recipient may selectively respond. As indicated in the table above bits 0–4 indicate a virtual interrupt pin for use at the destination thereby indicating the priority of the normal event. Bits 5–6 indicate whether the Event is responsive to an edge detected event or a level detected Event. Signals 173 and 174 are supplied to virtual interrupt pin logic 175 which is shown in more detail in FIG. 26. The incoming signals 173 and 174 are fed through a selector 176 to a register bank comprising virtual interrupt pins 0–31. Each of these pins has a hard wired priority level corresponding to the number of the pins. In other words, pin 0 has the highest priority referred to as priority 0 and pin 31 has the lowest priority 31. A register 178 holds a priority indicator of the current thread being executed by the CPU. A priority encoder 179 checks the range of virtual interrupt pins 177 to locate which pins now have an indication of an awaiting event. This encoder 179 then provides a signal on line 180 to a comparator 181 which compares the priority of any arriving event with the current CPU priority indicated in register 178. In this way the VIP logic 175 is able to make a selective decision depending on the priority of the incoming event packet as to whether or not the CPU should at this time take action to respond to the Event packet or not. If the priority encoder 179 indicates that the incoming event has higher priority than that indicated in register 178 an event launch signal is provided on line 182 to the CPU pipeline 183 shown in FIG. 25. The CPU pipeline 183 is provided with access to the instruction cache 42 and has a register file 184 which is used in the output of a transaction packet through a transmit buffer 185 connected to the P-link 15. The CPU pipeline 183 is also provided with a look-up table to provide an identification of instructions for an interrupt routine depending upon the source and device identifier of an event packet. If the VIP logic 175 determines that the CPU should respond to the Event packet, the Event decode logic 172 provides on line 186 details of the source and device ID of the event packet which is supplied on a control bus 187 to the CPU pipeline 183. This enables the CPU pipeline to identify the source of instructions for the interrupt routine appropriate to that source and device. To enable the CPU to resume the interrupted thread after responding to the event, the CPU priority held in the register 178 is transferred into a save priority register 187 so that at the end of the interrupt routine the original priority held in register 187 can be reestablished in register 178. Similarly the CPU pipeline 183 must both save the instruction pointer and thread status word appropriate to the interrupted thread for use in resumption of the thread after execution of the interrupt. These values are held in registers 188 and 189.

Figure 27:
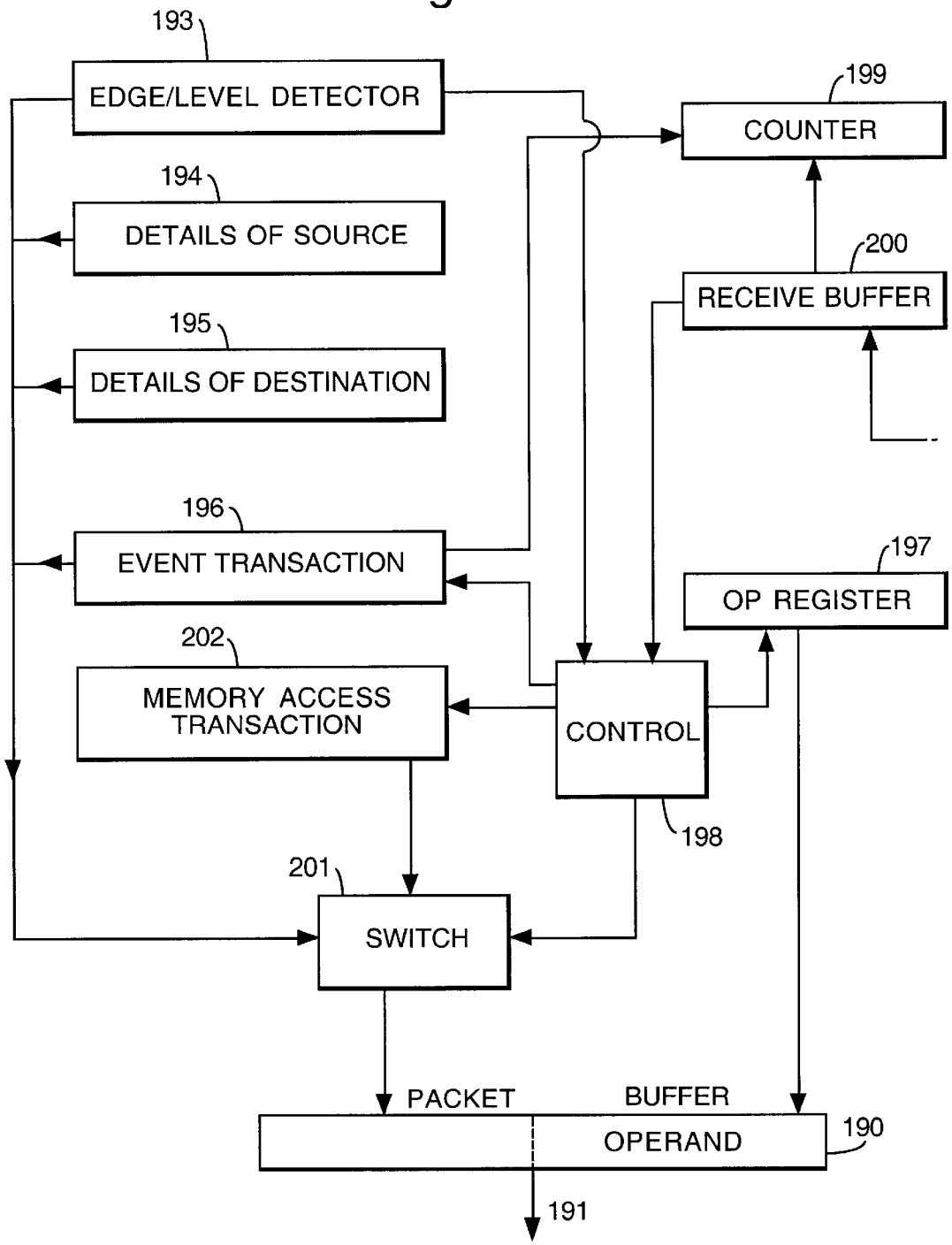
FIG. 27 shows an event logic and packet generator for use in modules connected to the data and address path of the devices shown in FIGS. 1 and 18.

In order to generate the event packets in the event logic 8 of each module shown in FIGS. 1 and 18, event logic and packet generator circuitry of the type shown in FIG. 27 is used. A packet buffer 190 is arranged to output a packet onto the P-link 15 via interconnection 191 when the packet has been assembled. The event logic will include a signal level or edge detector 193 in order to initiate the generation of an event packet. The particular device or module in which the event logic is located will store in a register 194 details of the source and a device identifier for the particular device at the source which is giving rise to the event packet. The module will also include in register 195 details of the destination address for any event packet generated by that module. Register 196 will hold details of the event transaction which will be requested by that device. It will have the bit pattern necessary to decide whether the event is a special event or a normal event and in the event of a normal event it will provide the event priority and event type. If that module is providing a special event, then an operand may be needed and this will be held in an operand register 197 for concatenation in an operand section of the packet buffer 190. If the device or module is also required to produce a memory access transaction packet then buffer 202 will operate under a control unit 198 to locate in the packet buffer 190 an indication of the memory access transaction rather than an event transaction. The device may well output more than one request packet prior to receiving any response packet. For this reason a counter 199 is provided to count the number of packets output and it also receives an input of the number of response packets received by buffer 200. The connection of event transaction data or memory access transaction data into the packet buffer 191 is controlled by a selector 201 controlled by the control unit 198. The contents of the registers and function of the control unit 198 will be determined by the particular implementation of the transaction packet generating circuitry at any particular device or module.

The invention is not limited to the details of the foregoing example.

What is claimed is:

1. A computer system comprising an integrated circuit device having an address and data path interconnecting a plurality of on-chip devices including at least one CPU, at least one other module and an external communication port, said CPU being arranged to generate event request packets and memory access packets, said module having circuitry responsive to an event to generate event request packets, each of said event and memory access packets including a destination address and being distributed in parallel format packets on said address and data path, the external communication port including circuitry to reduce the parallel format of each parallel packet to a more serial packet format for off-chip communication.

2. A computer system according to claim 1 in which said CPU and at least one other module includes packet generating circuitry operable in response to receipt of a request packet to generate a response packet for distribution on said address and data path.

3. A computer system according to claim 2 in which said packet generating circuitry is arranged to provide in each request packet an indication of the source of the packet as well as the destination, said source address being used as a destination address in each response packet.

4. A computer system according to claim 1 in which said address and data path comprises one or more buses arranged for distribution of request packets in bit parallel format.

5. A computer system according to claim 1 in which a memory interface is provided on-chip communicating with said address and data path to permit memory read and write operations.

6. A computer system according to claim 1 in which the external communication port on each chip includes bit format translation circuitry for translating on-chip bit parallel format to off-chip bit serial format.

7. A computer system according to claim 1 in which said at least one other module includes packet generating circuitry to generate event request packets of two types, the first type forming an interrupt request and a second type providing control commands.

8. A computer system according to claim 1 in which said integrated circuit device comprises an on-chip memory accessible by addressed memory access packets on said address and data path.

9. A computer system according to claim 1 including an on-chip memory interface connected to an off-chip memory.

10. A computer system according to claim 1 wherein at least one of the destination addresses is an off-chip address.

11. The computer system according to claim 1 wherein data contained in each of said serial format event request packets is substantially all of data contained in a parallel format event request packet from which it is reduced.

12. The computer system according to claim 11 wherein a substantially one-to-one equivalence exists between corresponding parallel format and serial format event request packets.

13. A method of operating a computer system comprising an integrated circuit device having an address and data path interconnecting a plurality of on-chip devices including at least one CPU, at least one other module and an external communication port, which method comprises distributing on said address and data path event request packets generated by packet generating circuitry in said at least one module and distributing event request packets and memory access packets generated by packet generating circuitry of said CPU, said event and memory access packets including a destination address and being distributed in parallel format packets on said address and data path and the external communication port being operated to reduce the parallel format of each parallel packet to a more serial packet format for off-chip communication.

14. A computer system according to claim 13 in which an off-chip memory is connected to an external memory interface on the chip, and memory access operations are effected by memory access packets on the address and data path addressing said external memory interface.

15. A method according to claim 14 in which communication through the external memory interface remain in bit parallel format.

16. A method of operating a computer system as claimed in claim 13 in which said event request packets include packets of two types, a first type forming an interrupt request and a second type providing control commands.

17. The method according to claim 13 wherein said operating the external communication port to reduce the parallel format of each packet to a more serial format includes identifying a type of the packet.

18. The method according to claim 17 wherein said operating the external communication port to reduce the parallel format of each packet to a more serial format includes copying across fields of the packet in a manner determined by the type of the packet.

19. The method according to claim 13 wherein one or more memory access operations are effected using an on-chip memory through a memory interface provided on-chip and communicating with said address and data path.

20. The method according to claim 13, further including:
an off-chip memory connected to an on-chip external memory interface; and wherein memory access operations are effected by memory access packets on an address and data path addressing said external memory interface.

21. A method according to claim 13 in which packet generating circuitry of said CPU is operable in response to receipt of a request packet to generate a response packet for distribution on said address and data path.

22. A method according to claim 21 in which each request packet includes an indication of the source of the packet as well as the destination, said source address being used as a destination address in each response packet.

23. A computer system according to claim 13 in which memory access operations are effective with an on-chip memory through a memory interface provided on-chip and communicating with said address and data path.

24. A method according to claim 13 wherein said operating the external communication port to reduce the parallel format of each parallel packet to a more serial packet format includes copying across the destination address of the parallel packet.

25. An integrated circuit device, comprising:
an address and data path, said address and data path being structured to interconnect at least one CPU, at least one second module, and an external communication port;
at least one CPU, said CPU being structured to generate an event packet and a data transfer packet, each of said event and data transfer packets including a destination address and being distributed in parallel format packets on said address and data path;
at least one second module, said module having circuitry responsive to an event to generate an event packet, said event packet including a destination address and being distributed in parallel format packets on said address and data path; and
an external communication port, said external communication port including circuitry structured to translate the parallel format of each parallel packet to a more serial packet format, wherein the packet contains substantially the same data in both parallel format and serial format.

26. The device recited in claim 25 wherein said address and data path comprises one or more buses structured to distribute request and response packets in bit parallel format.

27. The device recited in claim 25, further including a memory interface communicating with said address and data path to permit memory read and write operations.

28. The device recited in claim 25 wherein said external communication port further includes bit format translation circuitry structured to translate bit parallel format to bit serial format.

29. The device recited in claim 25 wherein said at least one second module includes packet generating circuitry structured to generate event request packets of two types, the first type forming an interrupt request and a second type providing control commands.

30. The device recited in claim 25, further including a memory accessible by an addressed data transfer packet on said address and data path.

31. The device recited in claim 25, further including a memory interface connected to an external memory.

32. The device recited in claim 25 wherein each of said CPU and said second module includes packet generating circuitry operable in response to receipt of a request packet to generate a response packet for distribution on said address and data path.

33. The device recited in claim 32 wherein said packet generating circuitry is structured to also generate in each request packet a source address, said source address being used as a destination address in each response packet.

34. A method of operating a computer system, the method comprising:
on an integrated circuit device, using an address and data path to interconnect at least one CPU, at least one additional module, and an external communication port;
generating a request packet in the at least one additional module, said request packet including a destination address;
distributing in parallel format on the address and data path the event request packet generated in the at least one additional module;
generating at least one of an event request packet and a memory access packet in the CPU, said one of an event request packet and a memory access packet including a destination address;
distributing in parallel format packets on the address and data path at least one of the event request packet and the memory access packet generated in the CPU; and
operating the external communication port to reduce the parallel format of each parallel packet distributed on the address and data path in parallel format packets to a more serial packet format.

35. The method recited in claim 34, further including:
receiving in the CPU a request packet to generate a response packet for distribution on the address and data path; and
wherein the generating an event request packet and a memory access packet in the CPU is a response to the receiving a request packet to generate a response packet for distribution on the address and data path.

36. The method recited in claim 35 wherein the request packet includes a packet source address and a packet destination address, the source address being used as a destination address in each response packet.

37. The method recited in claim 34 wherein:
an off-chip memory is connected to an external memory interface on the integrated circuit device; and
memory access operations are effected by memory access packets on the address and data path addressing the external memory interface.

38. The method recited in claim 37 wherein bit parallel format communication through the external memory interface remains in bit parallel format.

39. The method recited in claim 34 wherein the event request packet is one of a type of packet forming an interrupt request, and a type of packet providing a control command.

40. The method recited in claim 34 wherein the operating the external communication port to reduce the parallel format of each packet to a more serial format includes identifying the type of the packet.

41. The method recited in claim 40 wherein the operating the external communication port to reduce the parallel format of each packet to a more serial format includes copying across fields of the packet in a manner determined by the type of packet.

42. The method recited in claim 34 wherein the event request packet generated in the at least one additional module is generated by operating packet generating circuitry in the at least one additional module.

43. The method recited in claim 34 wherein the event request packet generated in the CPU is generated by operating packet generating circuitry in the CPU.

* * * * *